United States Patent
Jiang

(10) Patent No.: US 11,184,943 B2
(45) Date of Patent: Nov. 23, 2021

(54) FUNCTION ALLOCATING METHOD AND DEVICE, MESSAGE TRANSMITTING METHOD AND DEVICE, AND USER EQUIPMENT

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 11 days.

(21) Appl. No.: 16/699,349

(22) Filed: Nov. 29, 2019

(65) Prior Publication Data

US 2020/0100317 A1    Mar. 26, 2020

Related U.S. Application Data

(63) Continuation of application No. PCT/CN2017/089212, filed on Jun. 20, 2017.

(51) Int. Cl.
*H04W 76/27* (2018.01)
*H04W 28/06* (2009.01)
(Continued)

(52) U.S. Cl.
CPC .......... *H04W 76/27* (2018.02); *H04W 28/06* (2013.01); *H04W 80/02* (2013.01); *H04W 80/08* (2013.01)

(58) Field of Classification Search
CPC ..... H04W 76/27; H04W 28/06; H04W 80/02; H04W 80/08; H04W 24/02; H04L 1/1848;
(Continued)

(56) References Cited

U.S. PATENT DOCUMENTS

2015/0326456 A1* 11/2015 Dudda .................... H04L 47/27
370/252
2018/0213439 A1* 7/2018 Uchino ................. H04L 1/0004
(Continued)

FOREIGN PATENT DOCUMENTS

CN    103987109 A    8/2014
CN    104821859 A    8/2015
(Continued)

OTHER PUBLICATIONS

3GPP TSG-RAN WG2 #97;R2-1701462; Athens, Greece, Feb. 13-Feb. 17, 2017 (Year: 2017).*
(Continued)

*Primary Examiner* — Hassan A Phillips
*Assistant Examiner* — Mohammed S Chowdhury
(74) *Attorney, Agent, or Firm* — Syncoda LLC; Feng Ma

(57) ABSTRACT

A function allocating method includes receiving a radio resource control (RRC) message carrying allocation information transmitted by a base station, wherein the allocation information is used to allocate two radio link control (RLC) entities and one of a replication function and a distribution function of packet data convergence protocol (PDCP) packets to a data radio bearer (DRB) or a signaling radio bearer (SRB); and allocating, in response to the RRC message, the two RLC entities, and one of the replication function and the distribution function of the PDCP packets for the DRB or the SRB.

14 Claims, 17 Drawing Sheets

(51) Int. Cl.
H04W 80/02 (2009.01)
H04W 80/08 (2009.01)

(58) Field of Classification Search
CPC ......... H04L 1/1685; H04L 1/187; H04L 1/08;
H04L 5/001; H04L 5/0094; H04L 5/0053;
H04L 1/1867
See application file for complete search history.

(56) References Cited

U.S. PATENT DOCUMENTS

| | | | | |
|---|---|---|---|---|
| 2018/0287748 | A1* | 10/2018 | Kim | H04L 49/9015 |
| 2018/0367288 | A1* | 12/2018 | Vrzic | H04W 36/0069 |
| 2018/0368132 | A1* | 12/2018 | Babaei | H04W 80/02 |
| 2019/0268799 | A1* | 8/2019 | Hong | H04W 40/04 |
| 2019/0281655 | A1* | 9/2019 | Kim | H04L 1/1848 |
| 2020/0068581 | A1* | 2/2020 | Xu | H04W 80/08 |
| 2020/0068637 | A1* | 2/2020 | Yu | H04W 80/02 |
| 2020/0119864 | A1* | 4/2020 | Xu | H04W 80/08 |
| 2020/0322256 | A1* | 10/2020 | Tang | H04L 1/08 |
| 2020/0344723 | A1* | 10/2020 | Babaei | H04L 1/1874 |

FOREIGN PATENT DOCUMENTS

| | | | |
|---|---|---|---|
| CN | 105659690 | A | 6/2016 |
| CN | 106470439 | A | 3/2017 |
| WO | 2013155709 | A1 | 10/2013 |
| WO | 2013155846 | A1 | 10/2013 |
| WO | 2017076826 | A1 | 5/2017 |

OTHER PUBLICATIONS

3GPP TSG-RAN WG2 #97bis; R2-1702750; Spokane, USA, Apr. 3-7, 2017 (Year: 2017).*
3GPP TSG RAN WG2 Meeting #98; R2-1704836; Hangzhou, China, May 15-19, 2017 (Year: 2017).*
3GPP TSG-RAN WG2 Meeting # NR AH2; R2-1706378; Qingdao, China, May 27-29, 2017. (Year: 2017).*
3GPP TSG-RAN WG2#98; R2-1705213 ; Source: Huawei, HiSilicon; Title: RLC-PDCP coordination for PDCP-level Packet duplication, Hangzhou, China, May 15-19, 2017. (Year: 2017).*
3GPP TSG-RAN WG2#98; R2-1704143; Source: LG Electronics Inc.; Title: Packet duplication in PDCP, Hangzhou, China, May 15-May 19, 2017. (Year: 2017).*
3GPP TSG RAN WG2 Meeting #98; R2-1704836; Title: Interaction between PDCP/RLC/MAC for packet duplication; Hangzhou, China, May 15-19, 2017. (Year: 2017).*
2017104541664_15_Jun 2017_MT_STIC_With_Fig.pdf(official English translation (received from USPTO's Scientific & Technical Information Center, STIC) of the foreign priority document—CN 201710454166.4, Jun. 15, 2017) (Year: 2017).*
International Search Report in the international application No. PCT/CN2017/089212, dated Mar. 19, 2018.
CN 1st Office Action in Application No. 201780000659.9, dated Aug. 31, 2020.

* cited by examiner

FUNCTION ALLOCATING METHOD AND DEVICE, MESSAGE TRANSMITTING METHOD AND DEVICE, AND USER EQUIPMENT

CROSS-REFERENCE TO RELATED APPLICATION

This application is a continuation of International Application No. PCT/CN2017/089212 filed on Jun. 20, 2017, the disclosure of which is hereby incorporated by reference in its entirety.

BACKGROUND

Currently, the 3rd Generation Partnership Project (3GPP) is working on the standardization of the new radio (NR) of the 5th Generation (5G). In order to solve reliability problems of transmission of data packets or signaling packets, a data packet replication program of the packet data convergence protocol (PDCP) layer at user plane, has been accepted. PDCP packets and PDCP replication packets will not be completely transmitted by two carriers of the bottom layer since the PDCP layer is located at the top layer of the wireless user plane protocol stack. Consequently, the probability of successful transmission will be quite low when signal quality of a carrier, for carrying the PDCP packets and the PDCP replication packets, is very poor. In order to solve the problem, a proposal of in combination with the packet replication and the carrier at the PDCP layer is proposed in a conference. Split bearer, one bearer is mapped to two or more radio resource control (RRC) entities below the PDCP layer, and the PDCP layer will be mapped to different logical channels. The PDCP packets and the PDCP replication packets will be mapped to different physical carriers for transmission.

In addition, a user equipment (UE), which supports dual connectivity, i.e. the UE exchanging data with a Master Cell Group (MCG) and a Secondary Cell Group (SCG), is able to transmit data of a data radio bearer (DRB) or a signaling radio bearer (SRB), through the MCG and the SCG with the split bearer. The split bearer is previously used to transmit different data of a DRB or SRB via the MCG and the SCG, and the SCG played a role for distributing stream and increasing throughput. In addition, the split bearer is also used for PDCP packet replication and allows the SCG to transmit PDCP replication packets.

SUMMARY

The present disclosure generally relates to the field of communication technologies, and more specifically to a function allocating method and device, a message transmitting method and device, a user equipment, a base station, and a computer-readable storage medium.

In a first aspect of embodiments of the present disclosure, there is provided a function allocating method, the method includes steps of receiving a radio resource control (RRC) message carrying allocation information transmitted by a base station, wherein the allocation information is used to allocate two radio link control (RLC) entities and one of a replication function and a distribution function of packet data convergence protocol (PDCP) packets to a data radio bearer (DRB) or a signaling radio bearer (SRB); and allocating, in response to the RRC message, the two RLC entities, and one of the replication function or the distribution function of the PDCP packets for the DRB or the SRB.

In some embodiments, the two RLC entities adopt the same RLC mode.

In some embodiments, the RLC mode of the two RLC entities of the DRB allocated with the replication function of the PDCP packets includes an RLC unacknowledged mode (UM), and the RLC mode of the two RLC entities of the SRB allocated with the replication function of the PDCP packets includes an RLC UM or an RLC acknowledged mode (AM).

In some embodiments, the method further includes transmitting PDCP packet data units (PDUs) of the DRB or the SRB, allocated with the replication function of the PDCP packets, through the two corresponding RLC entities; or dividing the PDCP PDUs of the DRB or the SRB, allocated with the distribution function, into two groups, and transmitting one group through one RLC entity, and transmitting the other group through the other RLC entity.

In some embodiments, the method further includes re-transmitting unsuccessfully transmitted PDCP PDUs for the DRB or the SRB, allocated with the replication function of the PDCP packets, of the two RLC entities adopting the RLC UM mode, after the step of transmitting PDCP packet data units (PDUs) of the DRB or the SRB, allocated with the replication function of the PDCP packets, through the two corresponding RLC entities.

In some embodiments, the step of re-transmitting unsuccessfully transmitted PDCP PDUs includes re-transmitting a current PDCP PDU when a feedback information, transmitted by the base station, of the current PDCP PDU being not received within a first predefined time interval after the current PDCP PDU is transmitted, or a feedback information, transmitted by the base station, indicating the current PDCP PDU unsuccessfully received, which is received within the first predefined time interval after the current PDCP PDU is transmitted.

In some embodiments, the step of re-transmitting unsuccessfully transmitted PDCP PDUs includes re-transmitting PDCP PDUs unsuccessfully received by the base station, when a received feedback information indicates that the PDCP PDUs are unsuccessfully received by the base station.

In some embodiments, the method further includes adding a polling instruction in the current PDCP PDU as the current PDCP PDU being generated and predefined requirements being met, and transmitting the current PDCP PDU to the base station, before the step of re-transmitting a current PDCP PDU, wherein the polling instruction instructs the base station to transmit feedback information of the current PDCP PDU and feedback information of PDCP PDUs transmitted before the current PDCP PDU; wherein the predefined requirements include: a sum of data bytes of the current PDCP PDU and the PDCP PDUs, transmitted before the current PDCP PDU, reached a first predefined value; or a number of the current PDCP PDU and the PDCP PDUs, transmitted before the current PDCP PDU, reached a second predefined value; or a transmitting window which fails to transmit new PDCP PDUs after the current PDCP PDUs are transmitted; or none of PDCP PDUs being transmitted after the current PDCP PDU is transmitted.

In some embodiments, the method further includes adding a polling instruction in the current PDCP PDU, as the current PDCP PDU being generated, without receiving feedback information of other PDCP PDUs and a time interval, after a transmission of other PDCP PDUs, except the current PDCP PDU, being completed, being greater than a second predefined time interval, before the step of re-transmitting a current PDCP PDU, wherein the polling instruction is used to instructs the base station to transmit feedback information of the current PDCP PDU and feedback information of PDCP PDUs transmitted before the current PDCP PDU.

In some embodiments, the method further includes resetting the sum of data bytes of the current PDCP PDU and the PDCP PDUs, transmitted before the current PDCP PDU as adding the polling instruction in the current PDCP PDU, when the predefined requirement of a sum of data bytes of the current PDCP PDU and the PDCP PDUs, transmitted before the current PDCP PDU, reached a first predefined value is met; or resetting the number of the current PDCP PDU and the PDCP PDUs, transmitted before the current PDCP PDU as adding the polling instruction in the current PDCP PDU, when the predefined requirement of a number of the current PDCP PDU and the PDCP PDUs, transmitted before the current PDCP PDU, reached a second predefined value is met.

In a second aspect of the embodiments of the present disclosure, there is provided a message transmitting method, the method includes steps of determining a pending allocated data radio bearer (DRB) or a pending allocated signaling radio bearer (SRB) of a replication function or a distribution function of packet data convergence protocol (PDCP) packets; and transmitting a radio resource control (RRC) message carrying allocation information to a user equipment (UE), wherein the allocation information is used to allocate two radio link control (RLC) entities, and one of the replication function or the distribution function of PDCP packets for the DRB or the SRB.

In some embodiments, the two RLC entities adopt the same RLC mode.

In some embodiments, the RLC mode of the two RLC entities of the DRB allocated with the replication function of the PDCP packets includes an RLC unacknowledged mode (UM), and the RLC mode of the two RLC entities of the SRB allocated with the replication function of the PDCP packets includes an RLC UM or an RLC acknowledged mode (AM).

In some embodiments, the method further includes receiving PDCP packet data units (PDUs) transmitted by the UE and transmitting, at predefined time intervals, feedback information of the PDCP PDUs to the UE, after the step of transmitting a radio resource control (RRC) message carrying allocation information to a user equipment (UE).

In some embodiments, the method further includes receiving PDCP PDUs transmitted by the UE and transmitting feedback information of the PDCP PDUs to the UE, after the step of transmitting a radio resource control (RRC) message carrying allocation information to a user equipment (UE).

In some embodiments, the method further includes transmitting feedback information of a PDCP PDU for triggering a re-queuing timer and PDCP PDUs being queued, in a receiving window, before the PDCP PDU to the UE, as the triggered re-queuing timer being timeout, after the step of transmitting a radio resource control (RRC) message carrying allocation information to a user equipment (UE).

In some embodiments, the method further includes transmitting, in response to a polling instruction, feedback information of a PDCP PDU carrying the polling instruction and PDCP PDUs received before the PDCP PDU to the UE, as the PDCP PDU carrying the polling instruction being received, after the step of transmitting a radio resource control (RRC) message carrying allocation information to a user equipment (UE).

In a third aspect of the embodiments of the present disclosure, there is provided a function allocating device, the device includes a receiving module configured to receive a radio resource control (RRC) message carrying allocation information transmitted by a base station, wherein the allocation information is used to allocate two radio link control (RLC) entities and one of a replication function and a distribution function of packet data convergence protocol (PDCP) packets to a data radio bearer (DRB) or a signaling radio bearer (SRB); and an allocating module configured to allocate, in response to the RRC message, the two RLC entities, and one of the replication function or the distribution function of the PDCP packets for the DRB or the SRB.

In some embodiments, the two RLC entities adopt the same RLC mode.

In some embodiments, the RLC mode of the two RLC entities of the DRB allocated with the replication function of the PDCP packets includes an RLC unacknowledged mode (UM), and the RLC mode of the two RLC entities of the SRB allocated with the replication function of the PDCP packets includes an RLC UM or an RLC acknowledged mode (AM).

In some embodiments, the device further includes a first transmitting module configured to transmit PDCP packet data units (PDUs) of the DRB or the SRB, allocated with the replication function of the PDCP packets, through the two corresponding RLC entities; or a second transmitting module configured to divide the PDCP PDUs of the DRB or the SRB, allocated with the distribution function, into two groups, and transmit one group through one RLC entity, and transmit the other group through the other RLC entity.

In some embodiments, the device further includes a re-transmitting module configured to re-transmit unsuccessfully transmitted PDCP PDUs for the DRB or the SRB, allocated with the replication function of the PDCP packets, of the two RLC entities adopting the RLC UM mode, after the first transmitting module transmitting the PDCP PDUs of the DRB or the SRB, allocated with the replication function of the PDCP packets, through the two corresponding RLC entities.

In some embodiments, the re-transmitting module is configured to re-transmit a current PDCP PDU when a feedback information, transmitted by the base station, of the current PDCP PDU being not received within a first predefined time interval after the current PDCP PDU is transmitted, or a feedback information, transmitted by the base station, indicating the current PDCP PDU unsuccessfully received, which is received within the first predefined time interval after the current PDCP PDU is transmitted.

In some embodiments, the re-transmitting module is configured to re-transmit PDCP PDUs unsuccessfully received by the base station, when a received feedback information indicates that the PDCP PDUs are unsuccessfully received by the base station.

In some embodiments, the device further includes a first adding and transmitting module configured to add a polling instruction in the current PDCP PDU as the current PDCP PDU being generated and predefined requirements being met, and transmit the current PDCP PDU to the base station, before the re-transmitting module re-transmitting the current PDCP PDU, wherein the polling instruction instructs the base station to transmit feedback information of the current PDCP PDU and feedback information of PDCP PDUs transmitted before the current PDCP PDU; wherein the predefined requirements include a sum of data bytes of the current PDCP PDU and the PDCP PDUs, transmitted before the current PDCP PDU, reached a first predefined value; or a number of the current PDCP PDU and the PDCP PDUs, transmitted before the current PDCP PDU, reached a second predefined value; or a transmitting window which fails to transmit new PDCP PDUs after the current PDCP PDUs are transmitted; or none of PDCP PDUs being transmitted after the current PDCP PDU is transmitted.

In some embodiments, the device further includes a second adding and transmitting module configured to add a polling instruction in the current PDCP PDU as the current PDCP PDU being generated, and transmit the current PDCP PDU to the base station, without receiving feedback information of other PDCP PDUs and a time interval, after a transmission of other PDCP PDUs, except the current PDCP PDU, being completed, being greater than a second pre-defined time interval, before the re-transmitting module re-transmitting the current PDCP PDU, wherein the polling instruction is used to instructs the base station to transmit feedback information of the current PDCP PDU and feedback information of PDCP PDUs transmitted before the current PDCP PDU.

In some embodiments, the first adding and transmitting module is further configured to reset the sum of data bytes of the current PDCP PDU and the PDCP PDUs, transmitted before the current PDCP PDU as adding the polling instruction in the current PDCP PDU, when the predefined requirement of a sum of data bytes of the current PDCP PDU and the PDCP PDUs, transmitted before the current PDCP PDU, reached a first predefined value is met; or reset the number of the current PDCP PDU and the PDCP PDUs, transmitted before the current PDCP PDU as adding the polling instruction in the current PDCP PDU, when the predefined requirement of a number of the current PDCP PDU and the PDCP PDUs, transmitted before the current PDCP PDU, reached a second predefined value is met.

In a forth aspect of the embodiments of the present disclosure, there is provided a message transmitting device, the device includes a determining module configured to determine a pending allocated data radio bearer (DRB) or a pending allocated signaling radio bearer (SRB) of a replication function or a distribution function of packet data convergence protocol (PDCP) packets; and a first transmitting module configured to transmit a radio resource control (RRC) message carrying allocation information to a user equipment (UE), wherein the allocation information is used to allocate two radio link control (RLC) entities, and one of the replication function or the distribution function of PDCP packets for the DRB or the SRB.

In some embodiments, the two RLC entities adopt the same RLC mode.

In some embodiments, the RLC mode of the two RLC entities of the DRB allocated with the replication function of the PDCP packets includes an RLC unacknowledged mode (UM), and the RLC mode of the two RLC entities of the SRB allocated with the replication function of the PDCP packets includes an RLC UM or an RLC acknowledged mode (AM).

In some embodiments, the device further includes a first receiving and transmitting module configured to receive PDCP packet data units (PDUs) transmitted by the UE and transmit, at predefined time intervals, feedback information of the PDCP PDUs to the UE, after the first transmitting module transmitting the RRC message to the UE.

In some embodiments, the device further includes a second receiving and transmitting module configured to receive PDCP PDUs transmitted by the UE and transmit feedback information of the PDCP PDUs to the UE, after the first transmitting module transmitting the RRC message to the UE.

In some embodiments, the device further includes a determining and transmitting module configured to transmit feedback information, of a PDCP PDU for triggering a re-queuing timer and PDCP PDUs being queued, in a receiving window, before the PDCP PDU to the UE, as the triggered re-queuing timer being timeout, after the first transmitting module transmitting the RRC message to the UE.

In some embodiments, the device further includes a third receiving and transmitting module configured to transmit, in response to a polling instruction, feedback information of a PDCP PDU carrying the polling instruction and PDCP PDUs received before the PDCP PDU to the UE, as the PDCP PDU carrying the polling instruction being received, after the first transmitting module transmitting the RRC message to the UE.

In a fifth aspect of the embodiments of the present disclosure, there is provided a user equipment including a processor; and a memory for storing instructions executable by the processor; wherein the processor is configured to receive a radio resource control (RRC) message carrying allocation information transmitted by a base station, wherein the allocation information is used to allocate two radio link control (RLC) entities and one of a replication function and a distribution function of packet data convergence protocol (PDCP) packets to a data radio bearer (DRB) or a signaling radio bearer (SRB); and allocate, in response to the RRC message, the two RLC entities, and one of the replication function or the distribution function of the PDCP packets for the DRB or the SRB.

In a sixth aspect of the embodiments of the present disclosure, there is provided a base station including a processor; and a memory for storing instructions executable by the processor; wherein the processor is configured to determine a pending allocated data radio bearer (DRB) or a pending allocated signaling radio bearer (SRB) of a replication function or a distribution function of packet data convergence protocol (PDCP) packets; and transmit a radio resource control (RRC) message carrying allocation information to a user equipment (UE), wherein the allocation information is used to allocate two radio link control (RLC) entities, and one of the replication function or the distribution function of PDCP packets for the DRB or the SRB.

In a seventh aspect of the embodiments of the present disclosure, there is provided a computer-readable storage medium having stored therein instructions that, when executed by a processor, causes the processor to perform a function allocating method, the method including steps of receiving a radio resource control (RRC) message carrying allocation information transmitted by a base station, wherein the allocation information is used to allocate two radio link control (RLC) entities and one of a replication function and a distribution function of packet data convergence protocol (PDCP) packets to a data radio bearer (DRB) or a signaling radio bearer (SRB); and allocating, in response to the RRC message, the two RLC entities, and one of the replication function or the distribution function of the PDCP packets for the DRB or the SRB.

In an eighth aspect of the embodiments of the present disclosure, there is provided a computer-readable storage medium having stored therein instructions that, when executed by a processor, causes the processor to perform a message transmitting method, the method including steps of determining a pending allocated data radio bearer (DRB) or a pending allocated signaling radio bearer (SRB) of a replication function or a distribution function of packet data convergence protocol (PDCP) packets; and transmitting a radio resource control (RRC) message carrying allocation information to a user equipment (UE), wherein the allocation information is used to allocate two radio link control (RLC) entities, and one of the replication function or the distribution function of PDCP packets for the DRB or the SRB.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
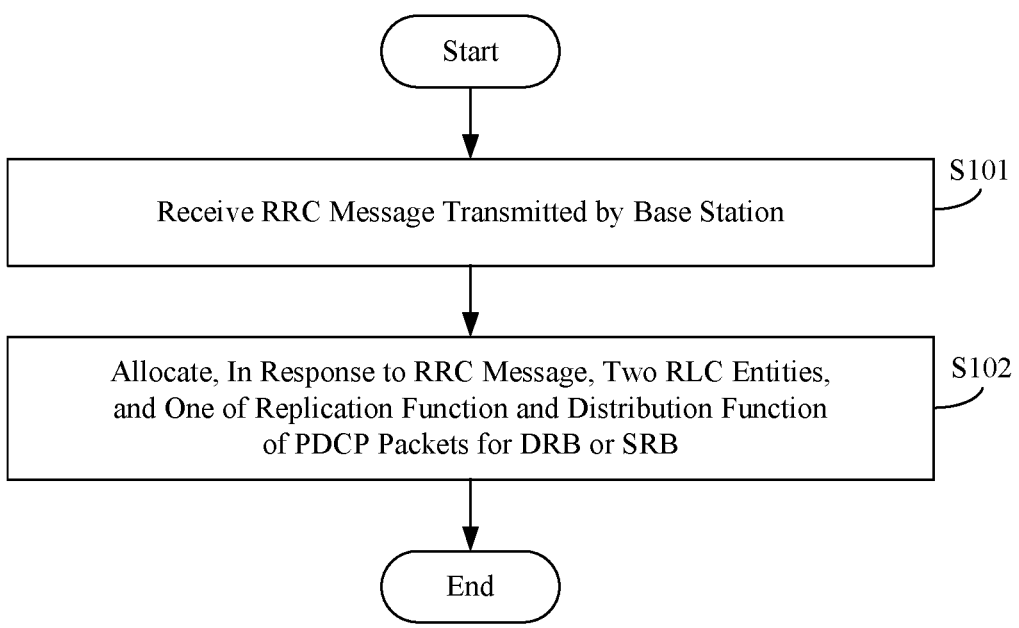
FIG. 1 is a flowchart of a function allocating method shown in an exemplary embodiment of the present disclosure.

FIG. 1 is a flowchart of a function allocating method shown in an exemplary embodiment of the present disclosure. This embodiment is described from the user-end. As shown in FIG. 1, the function allocating method includes steps S101 and S102.

In the step S101, a radio resource control (RRC) message, carrying allocation information, transmitted by a base station is received, wherein the allocation information is used to allocate two radio link control (RLC) entities and one of a replication function and a distribution function of packet data convergence protocol (PDCP) packets to a data radio bearer (DRB) or a signaling radio bearer (SRB).

The two RLC entities, allocated for the DRB or the SRB, adopt the same RLC mode. In this embodiment, the RLC mode of the two RLC entities of the DRB allocated with the replication function of the PDCP packets includes an RLC unacknowledged mode (UM), and the RLC mode of the two RLC entities of the SRB, allocated with the replication function of the PDCP packets, includes an RLC UM or an RLC acknowledged mode (AM).

Complexity of processing the PDU by the PDCP layer and time delay of receiving the PDCP PDU, by the base station, are reduced, when the two RLC entities, allocated with the DRB or the SRB, adopt the same RLC mode. Moreover, waste of wireless resources is reduced, when the RLC mode of the two RLC entities, corresponding to the DRB allocated with the replication function of the PDCP packets, are allocated with the RLC UM mode and the RLC mode of the two RLC entities, corresponding to the SRB allocated with the replication function of the PDCP packets, are allocated with the RLC UM mode or the RLC AM mode.

In the step 102, the DRB or the SRB is allocated with the two RLC entities, and one of the replication function or the distribution function of the PDCP packets, in response to the RRC message.

In this embodiment, the UE is able to perform allocations in response to the received RRC message. For example, the two RLC entities and the replication function of the PDCP packets are allocated to the corresponding DRB or SRB in response to the RRC message. The two RLC entities and the distribution function are allocated to the corresponding DRB or SRB in response to the RRC message.

In this embodiment, two entities and one of the replication function or the distribution function of the PDCP packets are allocated, in response to the received RRC message, to a DRB or a SRB. Therefore, only the replication function or the distribution function of the PDCP packets is allocated to a DRB or a SRB.

Figure 2:
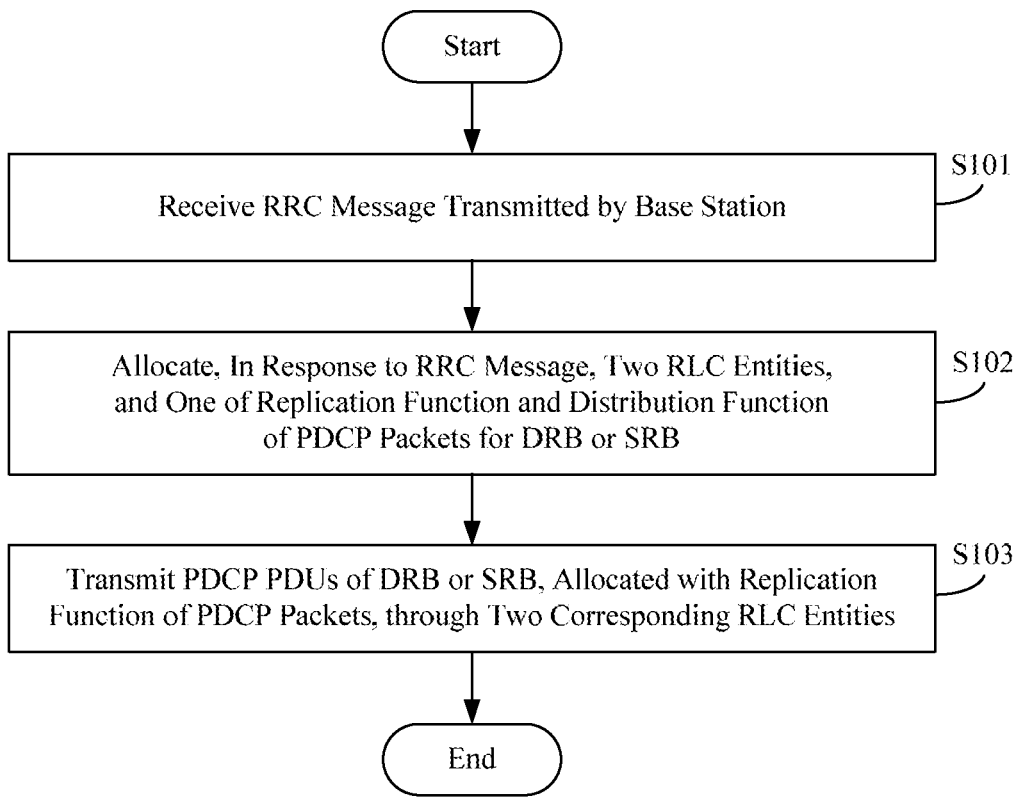
FIG. 2 is a flowchart of another function allocating method shown in an exemplary embodiment of the present disclosure.

FIG. 2 is a flowchart of another function allocating method shown in an exemplary embodiment of the present disclosure. As shown in FIG. 2, the function allocating method further includes a step 103 of transmitting PDCP packet data units (PDUs) of the DRB or the SRB, allocated with the replication function of the PDCP packets, through the two corresponding RLC entities, after the step 102.

When a DRB1 is allocated with the replication function of the PDCP packets, all PDCP PDUs of the DRB1 include a PDCP PDU1, a PDCP PDU2, a PDCP PDU3 and a PDCP PDU4, and two RLC entities allocated to the DRB1 include an RLC entity 1 and an RLC entity 2. The PDCP PDU1, the PDCP PDU2, the PDCP PDU3 and the PDCP PDU4 will be transmitted through the RLC entity 1 and the RLC entity 2 when the replication function of the PDCP packets of the DRB1 is activated. For example, the PDCP PDU1, the PDCP PDU2, the PDCP PDU3 and the PDCP PDU4 are transmitted through the RLC entity 1, and replication packets of the PDCP PDU1, the PDCP PDU2, the PDCP PDU3 and the PDCP PDU4 are transmitted through the RLC entity 2.

It should be noted that, PDCP PDUs of the DRB or the SRB, allocated with the distribution function, are required to be divided ininto two groups, wherein one group is transmitted through one RLC entity, and the other group is transmitted through the other RLC entity.

In this embodiment, the PDCP PDUs are dynamically divided ininto two groups, in response to cache state or channel quality of the two RLC entities. For example, one group with small amount of data is distributed to the RLC entity caching more PDCP PDUs, and the other group with large amount of data is distributed to the RLC entity caching less PDCP PDUs.

The transmission speed and number of successfully transmitted PDUs per time interval are increased, when the PDCP PDUs of the DRB or the SRB, allocated with the distribution function are divided ininto two groups, and one group is transmitted through one RLC entity, and the other group is transmitted through the other RLC entity.

In the above embodiments, success rate of transmission is increased, by transmitting all PDCP PDUs of the DRB or the SRB, allocated with the replication function of the PDCP packets, through the two corresponding RLC entities.

Figure 3:
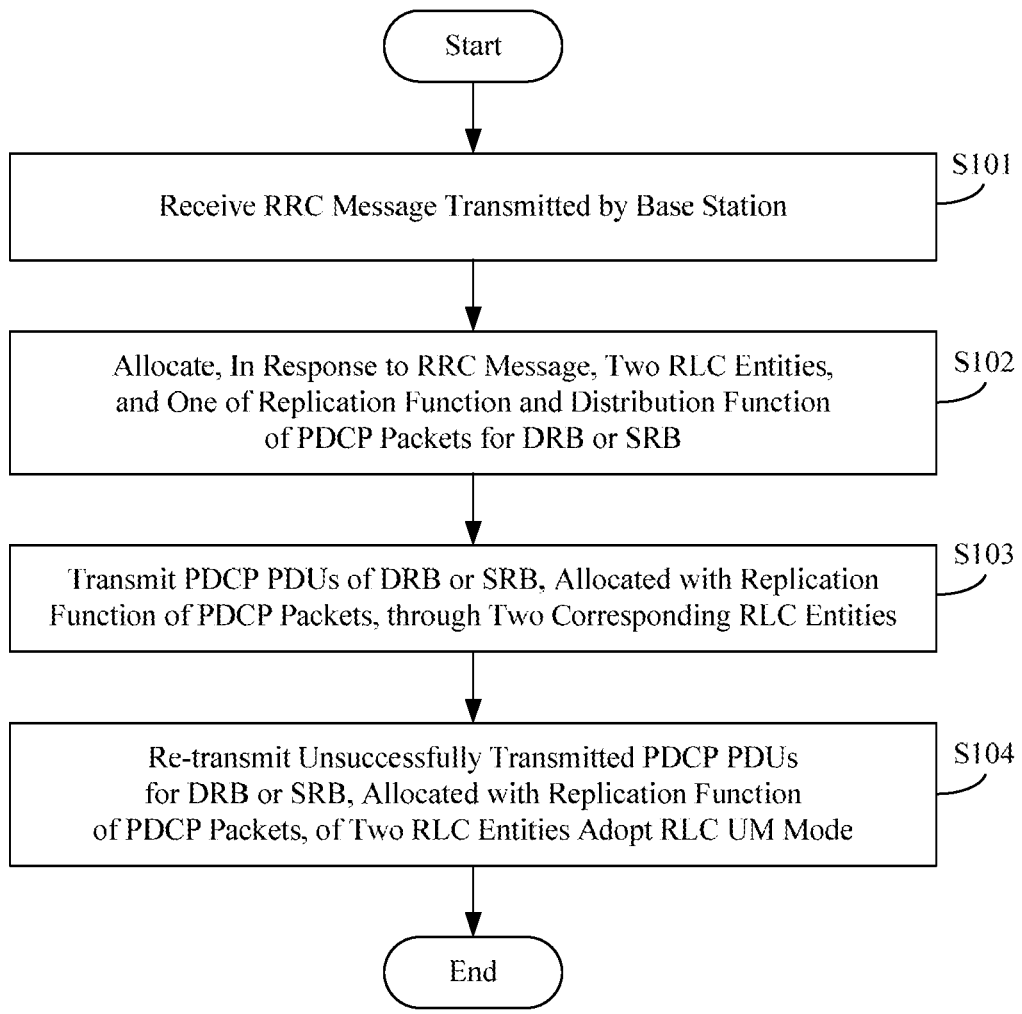
FIG. 3 is a flowchart of another function allocating method shown in an exemplary embodiment of the present disclosure.

FIG. 3 is a flowchart of another function allocating method shown in an exemplary embodiment of the present disclosure. As shown in FIG. 3, after the step S103 is performed, the function allocating method further includes a step S104 of re-transmitting unsuccessfully transmitted PDCP PDUs for the DRB or the SRB, allocated with the replication function of the PDCP packets, of the two RLC entities adopting the RLC UM mode. The re-transmission of the unsuccessfully transmitted PDCP PDUs includes, but is not limited to, at least one of the following situations.

In a first situation, a current PDCP PDU is re-transmitted, when a feedback information, transmitted by the base station, of the current PDCP PDU being not received within a first predefined time interval after the current PDCP PDU is transmitted, or a feedback information, transmitted by the base station, indicating the current PDCP PDU unsuccessfully received, which is received within the first predefined time interval after the current PDCP PDU is transmitted. The first predefined time interval is determined by the RRC layer.

In this embodiment, the first situation includes one or more of the following implementations.

In a first implementation, feedback information of a PDCP PDU is transmitted, by the base station, to the UE at predefined time intervals, after the PDCP PDU, transmitted by the UE, is received by the base station. Moreover, a current PDCP PDU is re-transmitted by the UE, when a feedback information, transmitted by the base station, of the current PDCP PDU being not received within a first predefined time interval after the current PDCP PDU is transmitted. In some embodiments, a feedback information, transmitted by the base station, indicating the current PDCP PDU unsuccessfully received, is received within the first predefined time interval after the current PDCP PDU is transmitted.

In a second implementation, feedback information of a PDCP PDU is transmitted, by the base station, to the UE, when the PDCP PDU, transmitted by the UE, is received by the base station. In addition, a current PDCP PDU is re-transmitted by the UE, when a feedback information, transmitted by the base station, of the current PDCP PDU which is not received within a first predefined time interval after the current PDCP PDU is transmitted. In some embodiments, a feedback information, transmitted by the base station, indicating the current PDCP PDU unsuccessfully received, is received within the first predefined time interval after the current PDCP PDU is transmitted.

In a third implementation, a polling instruction is added, by the UE, in a PDCP PDU, e.g. a current PDCD PDU, when the PDCD PDU is generated and predefined requirements are met. The current PDCP PDU is then transmitted, by the UE, to the base station. The base station then transmits, in response to the polling instruction, feedback information of the current PDCP PDU carrying the polling instruction, and feedback information of PDCP PDUs, received before the current PDCP PDU, to the UE, after the current PDCP PDU carrying the polling instruction is received by the base station. Moreover, a current PDCP PDU is re-transmitted by the UE, when a feedback information, transmitted by the base station, of the current PDCP PDU being not received within a first predefined time interval after the current PDCP PDU is transmitted. In some embodiments, a feedback information, transmitted by the base station, indicating the current PDCP PDU unsuccessfully received, is received within the first predefined time interval after the current PDCP PDU is transmitted.

The predefined requirements include, but are not limited to any one of the followings. A sum of data bytes of the current PDCP PDU and the PDCP PDUs, transmitted before the current PDCP PDU, reaches a first predefined value. A number of the current PDCP PDU and the PDCP PDUs, transmitted before the current PDCP PDU, reaches a second predefined value. A transmitting window fails to transmit new PDCP PDUs after the current PDCP PDUs are transmitted. None of PDCP PDUs is transmitted after the current PDCP PDU is transmitted. The first predefined value and the second predefined value are determined by the RRC layer.

For example, the UE transmits a PDCP PDU1 and a PDCP PDU2 to the base station, and then generates a PDCP PDU3. When the PDCP PDU3 being generated, a polling instruction will be added in the PDCP PDU3 when a sum of data bytes of the PDCP PDU1, the PDCP PDU2 and the PDCP PDU3 reaches the first predefined value. The PDCP PDU3 is then transmitted to the base station. The base station then transmits, in response to the polling instruction, feedback information of the PDCP PDU1, the PDCP PDU2 and the PDCP PDU3 to the UE, after the PDCP PDU3 is received. The PDCP PDU1 will be re-transmitted by the UE, when a feedback information, transmitted by the base station, of the PDCP PDU1 being not received within the first predefined time interval after the PDCP PDU1 is transmitted.

It should be noted that the sum of data bytes of the current PDCP PDU and the PDCP PDUs transmitted before the current PDCP PDU will be reset, as the polling instruction being added in the current PDCP PDU, when the predefined requirement of a sum of data bytes of the current PDCP PDU and the PDCP PDUs, transmitted before the current PDCP PDU, reached a first predefined value is met. Resetting the sum of data bytes of the current PDCP PDU and the PDCP PDUs transmitted before the current PDCP PDU is for the purpose of, counting whether a sum of data bytes of previously transmitted PDCP PDUs and a new PDCP PDU reached the first predefined value, and determining whether to add a polling indication in the new PDCP PDU, as the new PDCP PDU being generated. Similarly, the number of the current PDCP PDU and the PDCP PDUs transmitted before the current PDCP PDU will be reset, as the polling instruction being added in the current PDCP PDU, when the predefined requirement of a number of the current PDCP PDU and the PDCP PDUs transmitted before the current PDCP PDU reached a second predefined value is met. The purpose of resetting the number of the current PDCP PDU and the PDCP PDUs transmitted before the current PDCP PDU is counted whether a number of previously transmitted PDCP PDUs and a new PDCP PDU reached the second predefined value, and determine whether to add a polling indication in the new PDCP PDU, as the new PDCP PDU being generated.

In a fourth implementation, a polling instruction is added in the current PDCP PDU and the current PDCP PDU is transmitted to the base station as the current PDCP PDU being generated, when feedback information of the PDCP PDU is not received, and a second pre-defined time interval of transmission, made by the UE, of other PDCP PDUs, except the current PDCP PDU, to the base station is timeout. The current PDCP PDU is then transmitted to the base station. The base station then transmits, in response to the polling instruction, feedback information, of the PDCP PDU carrying the polling instruction, e.g. the current PDCP PDU, and PDCP PDUs received before current PDCP PDU, to the UE, after the current PDCP PDU carrying the polling instruction is received by the base station. The current PDCP PDU will be re-transmitted by the UE, when a feedback information, transmitted by the base station, of the current PDCP PDU is not received within a first predefined time interval after the current PDCP PDU being transmitted, or a feedback information, transmitted by the base station, indicating the current PDCP PDU unsuccessfully received, being received within the first predefined time interval after the current PDCP PDU being transmitted. The second pre-defined time interval is defined by the RRC layer.

For example, a polling instruction will be added in the PDCP PDU2 as the PDCP PDU2 being generated by the UE, when feedback information of a PDCP PDU1 is not received within the second predefined time interval after the PDCP PDU1 being transmitted to the base station. The PDCP PDU2 is then transmitted to the base station. The base station then transmits, in response to the polling instruction, feedback information of the PDCP PDU1 and the PDCP PDU2, to the UE, after the PDCP PDU2 is received. The PDCP PDU2 will be re-transmitted by the UE, when a feedback information of the PDCP PDU2, indicating the PDCP PDU2 unsuccessfully received by the base station, is received within the first predefined time interval after the PDCP PDU2 being transmitted.

In a second situation, PDCP PDUs, unsuccessfully received by the base station, are re-transmitted when a received feedback information indicates that the PDCP PDUs are unsuccessfully received by the base station.

In this embodiment, feedback information of a PDCP PDU, for triggering a re-queuing timer and PDCP PDUs being queued in a receiving window before the PDCP PDU, are transmitted, by the base station, to the UE, as the triggered re-queuing timer being timeout. In addition, PDCP PDUs, unsuccessfully received by the base station, are re-transmitted by the UE, when a received feedback information indicates that the PDCP PDUs are unsuccessfully received by the base station.

For example, a PDCP PDU1, a PDCP PDU2, a PDCP PDU3, a PDCP PDU4 and a PDCP PDU5 are transmitted, by the UE, in sequence to the base station. The PDCP PDU1, the PDCP PDU2 and the PDCP PDU5 are received in sequence, by base station from the receiving window. The re-queuing timer is triggered as the PDCP PDU5 being received, which indicates the PDCP PDU5 is the PDCP PDU for triggering the re-queuing timer. The base station then transmits feedback information of the PDCP PDU5 and PDCP PDUs before the PDCP PDU5, e.g. feedback information of the PDCP PDU1, the PDCP PDU2, the PDCP PDU3, the PDCP PDU4 and the PDCP PDU5, to the UE. The PDCP PDU3 and the PDCP PDU4 will be re-transmitted by the UE to the base station, when feedback information of the PDCP PDU3 indicates that the PDCP PDU3 is unsuccessfully received by the base station and feedback information of the PDCP PDU4 indicates that the PDCP PDU4 is unsuccessfully received by the base station.

It can be seen that the above embodiments are able to re-transmit the unsuccessfully transmitted PDCP PDUs by various implementations.

In the above embodiments, re-transmission of unsuccessfully transmitted data are implemented to ensure reliability of service supporting the PDCP packet replication function, by re-transmitting the unsuccessfully transmitted PDCP PDUs for the DRB or the SRB, allocated with the replication function of the PDCP packets, of the two RLC entities adopting the RLC UM mode.

Figure 4:
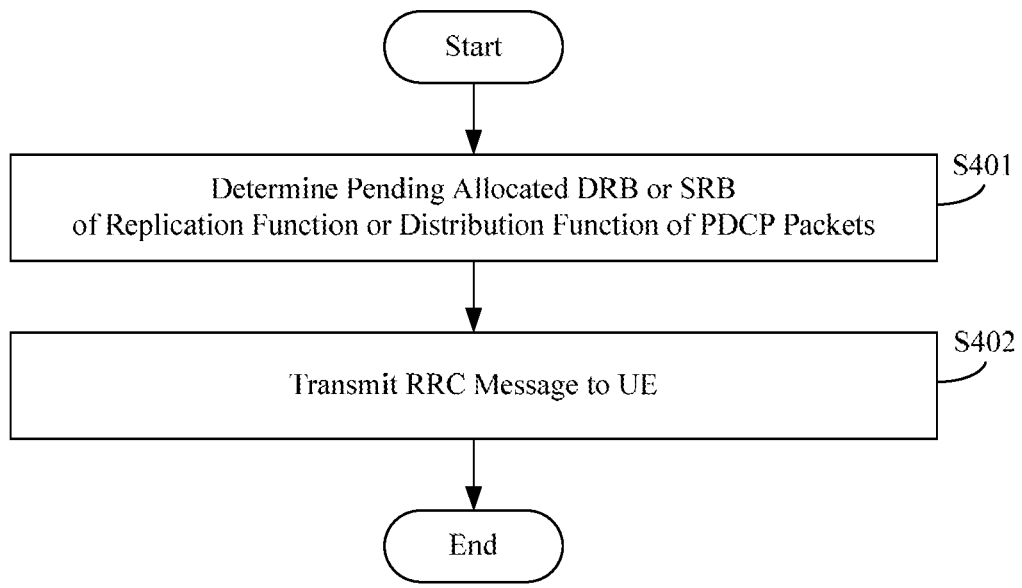
FIG. 4 is a flowchart of a message transmitting method shown in an exemplary embodiment of the present disclosure.

FIG. 4 is a flowchart of a message transmitting method shown in an exemplary embodiment of the present disclosure. This embodiment is described from the base station. As shown in FIG. 4, the message transmitting method includes a step S401 and a step S402.

In the step 401, a pending allocated DRB or SRB of a replication function or a distribution function of PDCP packets is determined.

In this embodiment, the base station is able to determine one or some DRBs or SRBs pending to be allocated with one of the replication function or the distribution function of the PDCP packets.

In the step 402, an RRC message carrying allocation information is transmitted to the UE, wherein the allocation information is used to allocate RLC entities, and one of the replication function or the distribution function of PDCP packets for the DRB or the SRB.

In this embodiment, the base station is able to transmit the RRC message carrying allocation information to the UE, after the pending allocated DRB or SRB of the replication function or the distribution function of PDCP packets is determined. The allocation information is used to allocate RLC entities, and one of the replication function or the distribution function of PDCP packets for the DRB or the SRB.

The two RLC entities allocated for the DRB or the SRB adopt the same RLC mode. In this embodiment, the RLC mode of the two RLC entities of the DRB allocated with the replication function of the PDCP packets includes an RLC UM mode, and the RLC mode of the two RLC entities of the SRB allocated with the replication function of the PDCP packets includes an RLC UM or an RLC AM mode.

In the above embodiments, the UE is allowed to allocate, in response to the received RRC message, the two RLC entities, and one of the replication function or the distribution function of PDCP packets for the DRB or the SRB, and the DRB or SRB is allocated with one of the replication function or the distribution function of the PDCP packets, by transmitting the RRC message to the UE.

Figure 5:
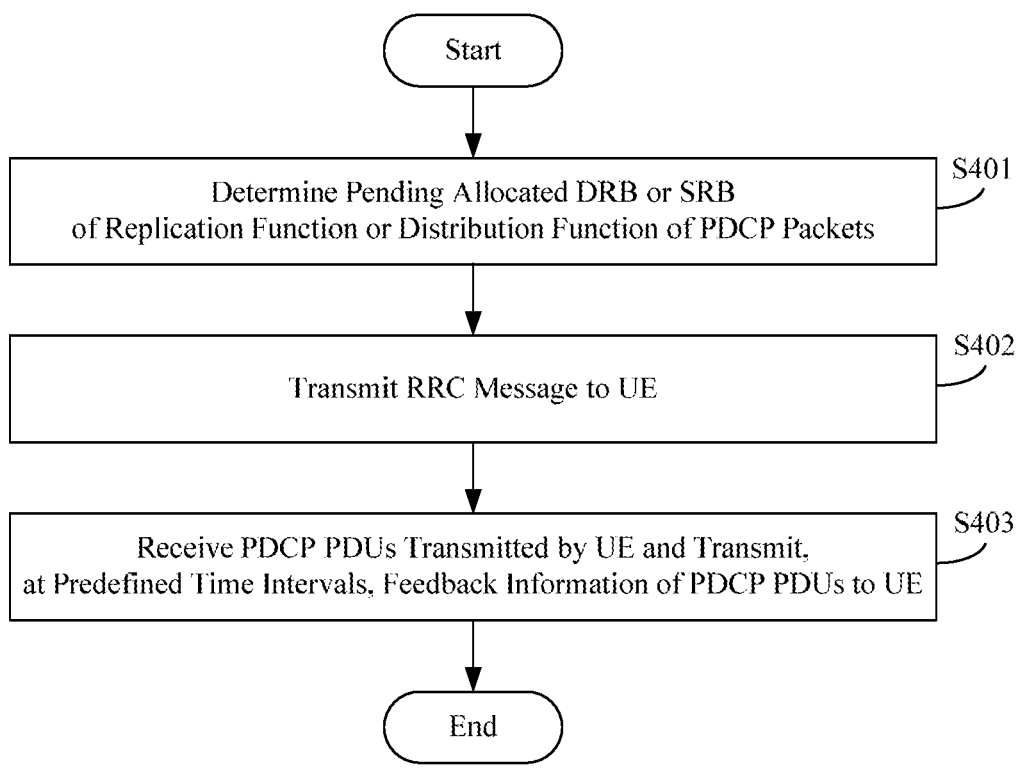
FIG. 5 is a flowchart of another message transmitting method shown in an exemplary embodiment of the present disclosure.

FIG. 5 is a flowchart of another message transmitting method shown in an exemplary embodiment of the present disclosure. As shown in FIG. 5, the message transmitting method further includes a step S403 of receiving PDCP PDUs transmitted by the UE and transmitting, at predefined time intervals, feedback information of the PDCP PDUs to the UE, after the step 402.

In this embodiment, the base station is able to transmit, at the predefined time intervals, feedback information of PDCP PDUs to the UE, after receiving the PDCP PDUs transmitted by the UE.

It should be noted that, except the step S403, the base station is able to transmit feedback information of the PDCP PDUs to the UE in any of the following manners. The manners include receiving PDCP PDUs, transmitted by the UE, and transmitting feedback information of the PDCP PDUs to the UE; transmitting feedback information of a PDCP PDU for triggering a re-queuing timer and PDCP PDUs being queued, in a receiving window, before the PDCP PDU to the UE, as the triggered re-queuing timer being timeout; and transmitting, in response to a polling instruction, feedback information of a PDCP PDU carrying the polling instruction and PDCP PDUs received before the PDCP PDU to the UE, as the PDCP PDU carrying the polling instruction being received.

It can be seen that this embodiment is able to transmit feedback information to the UE in various implementations.

The UE is able to determine and re-transmit unsuccessfully transmitted PDCP PDUs after receiving feedback information of the PDCP PDUs.

In the above embodiments, the UE is allowed to determine and re-transmit unsuccessfully transmitted PDCP PDUs after receiving the feedback information of the PDCP PDUs, by receiving PDCP PDUs transmitted by the UE and transmitting, at predefined time intervals, feedback information of the PDCP PDUs to the UE.

Figure 6:
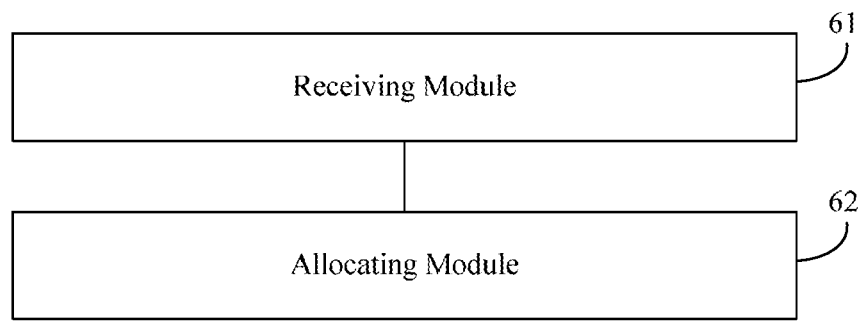
FIG. 6 is a block diagram of a function allocating device shown in an exemplary embodiment.

FIG. 6 is a block diagram of a function allocating device shown in an exemplary embodiment, the function allocating device is configured in the UE. As shown in FIG. 6, the function allocating device includes a receiving module 61 and an allocating module 62.

The receiving module 61 is configured to receive an RRC message carrying allocation information, transmitted by the base station, wherein the allocation information is used to allocate two RLC entities and one of the replication function or the distribution function of PDCP packets to a DRB or a SRB.

The two RLC entities, allocated for the DRB or the SRB, adopt the same RLC mode. In this embodiment, the RLC mode of the two RLC entities of the DRB allocated with the replication function of the PDCP packets includes the RLC UM mode, and the RLC mode of the two RLC entities of the SRB, allocated with the replication function of the PDCP packets, includes the RLC UM mode or the RLC AM mode.

Complexity of processing the PDU by the PDCP layer, and time delay of receiving the PDCP PDU by the base station are reduced, by the two RLC entities allocated for the DRB or the SRB adopting the same RLC mode. Moreover, waste of wireless resources is reduced, when the RLC mode, of the two RLC entities, corresponding to the DRB allocated with the replication function of the PDCP packets, are allocated with the RLC UM mode, and the RLC mode of the two RLC entities, corresponding to the SRB allocated with the replication function of the PDCP packets, are allocated with the RLC UM mode or the RLC AM mode.

The allocating module 62 is configured to allocate, in response to the RRC message received by the receiving module 61, the two RLC entities and one of the replication function or the distribution function of the PDCP packets for the DRB or the SRB.

In this embodiment, the UE is able to perform allocations in response to the received RRC message, for example, allocating the two RLC entities and the replication function of the PDCP packets for the corresponding DRB or SRB, or allocating the two RLC entities and the distribution function for the corresponding DRB or SRB.

In this embodiment, two entities and one of the replication function or the distribution function of the PDCP packets are allocated, in response to the received RRC message, to a DRB or a SRB. Therefore, only the replication function or the distribution function of the PDCP packets is allocated to a DRB or an SRB.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Figure 7:
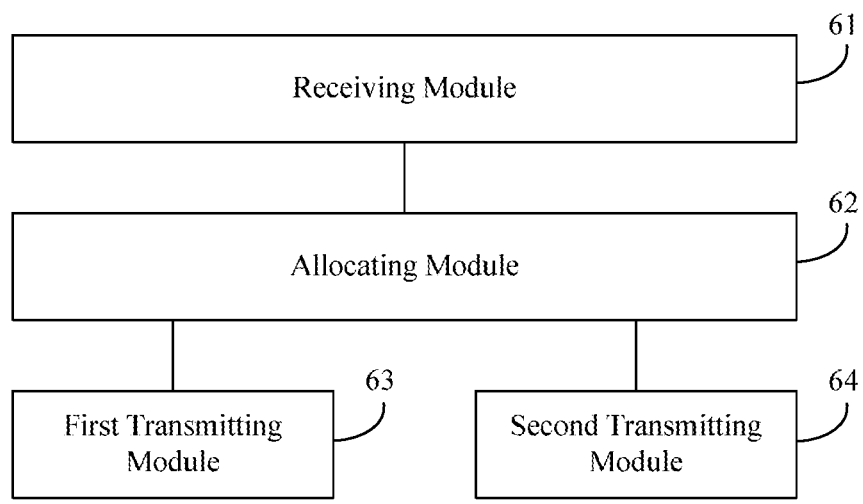
FIG. 7 is a block diagram of another function allocating device shown in an exemplary embodiment.

FIG. 7 is a block diagram of another function allocating device shown in an exemplary embodiment. As shown in FIG. 7, the function allocating device further includes a first transmitting module 63 or a second transmitting module 64 on the basis of the embodiment shown in FIG. 6.

The first transmitting module 63 is configured to transmit PDCP PDUs of the DRB or the SRB, allocated with the replication function of the PDCP packets, through the two corresponding RLC entities.

When a DRB1 is allocated with the replication function of the PDCP packets, all PDCP PDUs of the DRB1 include a PDCP PDU1, a PDCP PDU2, a PDCP PDU3 and a PDCP PDU4, and two RLC entities allocated to the DRB1 include an RLC entity 1 and an RLC entity 2. The PDCP PDU1, the PDCP PDU2, the PDCP PDU3 and the PDCP PDU4 will be transmitted through the RLC entity 1 and the RLC entity 2 when the replication function of the PDCP packets of the DRB1 is activated. For example, the PDCP PDU1, the PDCP PDU2, the PDCP PDU3 and the PDCP PDU4 are transmitted through the RLC entity 1, and replication packets of the PDCP PDU1, the PDCP PDU2, the PDCP PDU3 and the PDCP PDU4 are transmitted through the RLC entity 2.

The second transmitting module 64 is configured to divide the PDCP PDUs of the DRB or the SRB, allocated with the distribution function, into two groups, and transmit one group through one RLC entity, and transmit the other group through the other RLC entity.

In this embodiment, the PDCP PDUs are dynamically divided into two groups, in response to cache state or channel quality of the two RLC entities. For example, one group with small amount of data is distributed to the RLC entity caching more PDCP PDUs, and the other group with large amount of data is distributed to the RLC entity caching less PDCP PDUs.

In the above embodiments, success rate of transmission is increased, by transmitting PDCP PDUs of the DRB or the SRB, allocated with the replication function of the PDCP packets, through the two corresponding RLC entities. Moreover, speed of transmission and number of successfully transmitted PDUs per time interval are increased, when the PDCP PDUs of the DRB or the SRB, allocated with the distribution function, are divided into two groups, and one group is transmitted through one RLC entity, and the other group is transmitted through the other RLC entity.

Figure 8:
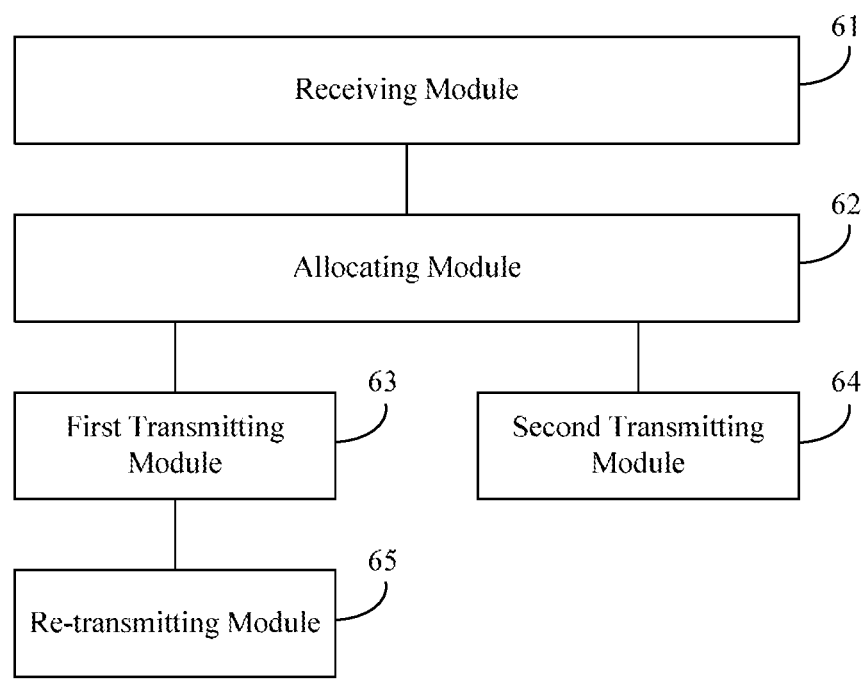
FIG. 8 is a block diagram of another function allocating device shown in an exemplary embodiment.

FIG. 8 is a block diagram of another function allocating device presented in an exemplary embodiment. As shown in FIG. 8, the function allocating device further includes a re-transmitting module 65 on the basis of the embodiment in FIG. 7. The re-transmitting module 65 is configured to re-transmit unsuccessfully transmitted PDCP PDUs for the DRB or the SRB, allocated with the replication function of the PDCP packets, of the two RLC entities adopting the RLC UM mode, after the PDCP PDUs, of the DRB or the SRB allocated with the replication function of the PDCP packets, are transmitted, by the first transmitting module 63, through the two corresponding RLC entities.

In some embodiments, the re-transmitting module 65 is configured to re-transmit a current PDCP PDU when a feedback information, transmitted by the base station, of the current PDCP PDU being not received within a first pre-defined time interval after the current PDCP PDU is transmitted, or a feedback information, transmitted by the base station, indicating the current PDCP PDU unsuccessfully received, being received within the first predefined time interval after the current PDCP PDU is transmitted. The first predefined time is determined by the RRC layer.

In this embodiment, the PDCP PDU is re-transmitted, by the re-transmitting module 65, via any one or more of the following implementations.

In a first implementation, feedback information of a PDCP PDU is transmitted, at predefined time intervals, by the base station, to the UE, after the PDCP PDU transmitted by the UE is received by the base station. Moreover, a current PDCP PDU is re-transmitted by the UE, when a feedback information, transmitted by the base station, of the current PDCP PDU being not received within a first pre-defined time interval after the current PDCP PDU is transmitted. In some embodiments, a feedback information, transmitted by the base station, indicating the current PDCP PDU unsuccessfully received, being received within the first predefined time interval after the current PDCP PDU is transmitted.

In a second implementation, feedback information of a PDCP PDU is transmitted, by the base station, to the UE, when the PDCP PDU transmitted by the UE is received by the base station. In addition, a current PDCP PDU is re-transmitted by the UE, when a feedback information, transmitted by the base station, of the current PDCP PDU being not received within a first predefined time interval after the current PDCP PDU is transmitted. In some embodiments, a feedback information, transmitted by the base station, indicating the current PDCP PDU unsuccessfully received, is received within the first predefined time interval after the current PDCP PDU is transmitted.

In a third implementation, a polling instruction is added, by the UE, in a PDCP PDU, e.g. a current PDCP PDU, when the PDCP PDU is generated and predefined requirements are met. The current PDCP PDU is then transmitted, by the UE, to the base station. The base station then transmits, in response to the polling instruction, feedback information of the current PDCP PDU carrying the polling instruction, and feedback information of PDCP PDUs, received before the current PDCP PDU, to the UE, after the current PDCP PDU carrying the polling instruction is received by the base station. Moreover, a current PDCP PDU is re-transmitted by the UE, when a feedback information, transmitted by the base station, of the current PDCP PDU being not received within a first predefined time interval after the current PDCP PDU is transmitted. In some embodiments, a feedback information, transmitted by the base station, indicating the current PDCP PDU unsuccessfully received, is received within the first predefined time interval after the current PDCP PDU is transmitted.

The predefined requirements include, but are not limited to, any one of the followings. A sum of data bytes of the current PDCP PDU and the PDCP PDUs, transmitted before the current PDCP PDU, reaches a first predefined value. A number of the current PDCP PDU and the PDCP PDUs, transmitted before the current PDCP PDU, reaches a second predefined value. A transmitting window fails to transmit new PDCP PDUs after the current PDCP PDUs are transmitted. None of PDCP PDUs is transmitted after the current PDCP PDU is transmitted. The first predefined value and the second predefined value are determined by the RRC layer.

For example, the UE transmits a PDCP PDU1 and a PDCP PDU2 to the base station, and then generates a PDCP PDU3. When the PDCP PDU3 being generated, a polling instruction will be added in the PDCP PDU3 when a sum of data bytes of the PDCP PDU1, the PDCP PDU2 and the PDCP PDU3 reaches the first predefined value. The PDCP PDU3 is then transmitted to the base station. The base station then transmits, in response to the polling instruction, feedback information of the PDCP PDU1, the PDCP PDU2 and the PDCP PDU3 to the UE, after the PDCP PDU3 is received. The PDCP PDU1 will be re-transmitted by the UE, when a feedback information, transmitted by the base station, of the PDCP PDU1 being not received within the first predefined time interval after the PDCP PDU1 is transmitted.

It should be noted that the sum of data bytes of the current PDCP PDU and the PDCP PDUs transmitted before the current PDCP PDU will be reset, as the polling instruction being added in the current PDCP PDU, when the predefined requirement of a sum of data bytes of the current PDCP PDU and the PDCP PDUs, transmitted before the current PDCP PDU, reached a first predefined value is met. Resetting the sum of data bytes of the current PDCP PDU and the PDCP PDUs transmitted before the current PDCP PDU is for the purpose of, counting whether a sum of data bytes of previously transmitted PDCP PDUs and a new PDCP PDU reached the first predefined value, and determining whether to add a polling indication in the new PDCP PDU, as the new PDCP PDU being generated. Similarly, the number of the current PDCP PDU and the PDCP PDUs transmitted before the current PDCP PDU will be reset, as the polling instruction being added in the current PDCP PDU, when the predefined requirement of a number of the current PDCP PDU and the PDCP PDUs transmitted before the current PDCP PDU reached a second predefined value is met. The purpose of resetting the number of the current PDCP PDU and the PDCP PDUs transmitted before the current PDCP PDU is counted whether a number of previously transmitted PDCP PDUs and a new PDCP PDU reached the second predefined value, and determine whether to add a polling indication in the new PDCP PDU, as the new PDCP PDU being generated.

In a fourth implementation, a polling instruction is added in the current PDCP PDU and the current PDCP PDU is transmitted to the base station as the current PDCP PDU being generated, when feedback information of the PDCP PDU is not received, and a second pre-defined time interval of transmission, made by the UE, of other PDCP PDUs, except the current PDCP PDU, to the base station is timeout. The current PDCP PDU is then transmitted to the base station. The base station then transmits, in response to the polling instruction, feedback information, of the PDCP PDU carrying the polling instruction, e.g. the current PDCP PDU, and PDCP PDUs received before current PDCP PDU, to the UE, after the current PDCP PDU carrying the polling instruction is received by the base station. The current PDCP PDU will be re-transmitted by the UE, when a feedback information, transmitted by the base station, of the current PDCP PDU is not received within a first predefined time interval after the current PDCP PDU being transmitted, or a feedback information, transmitted by the base station, indicating the current PDCP PDU unsuccessfully received, being received within the first predefined time interval after the current PDCP PDU being transmitted. The second predefined time interval is defined by the RRC layer.

For example, a polling instruction will be added in the PDCP PDU2 as the PDCP PDU2 being generated by the UE, when feedback information of a PDCP PDU1 is not received within the second predefined time interval after the PDCP PDU1 being transmitted to the base station. The PDCP PDU2 is then transmitted to the base station. The base station then transmits, in response to the polling instruction, feedback information of the PDCP PDU1 and the PDCP PDU2, to the UE, after the PDCP PDU2 is received. The PDCP PDU2 will be re-transmitted by the UE, when a feedback information of the PDCP PDU2, indicating the PDCP PDU2 unsuccessfully received by the base station, is received within the first predefined time interval after the PDCP PDU2 being transmitted.

In another embodiment, the re-transmitting module 65 is configured to re-transmit PDCP PDUs unsuccessfully received by the base station, when a received feedback information indicates that the PDCP PDUs are unsuccessfully received by the base station.

In this embodiment, feedback information of a PDCP PDU for triggering a re-queuing timer and PDCP PDUs being queued in a receiving window before the PDCP PDU, are transmitted, by the base station, to the UE, as the triggered re-queuing timer being timeout. In addition, PDCP PDUs unsuccessfully received by the base station are re-transmitted by the UE, when a received feedback information indicates that the PDCP PDUs are unsuccessfully received by the base station.

For example, a PDCP PDU1, a PDCP PDU2, a PDCP PDU3, a PDCP PDU4 and a PDCP PDU5 are transmitted, by the UE, in sequence to the base station. The PDCP PDU1, the PDCP PDU2 and the PDCP PDU5 are received in sequence, by base station from the receiving window. The re-queuing timer is triggered as the PDCP PDU5 being received, which indicates the PDCP PDU5 is the PDCP PDU for triggering the re-queuing timer. The base station then transmits feedback information of the PDCP PDU5 and PDCP PDUs before the PDCP PDU5, e.g. feedback information of the PDCP PDU1, the PDCP PDU2, the PDCP PDU3, the PDCP PDU4 and the PDCP PDU5, to the UE. In addition, the PDCP PDU3 and the PDCP PDU4 will be re-transmitted by the UE to the base station, when feedback information of the PDCP PDU3 indicates that the PDCP PDU3 is unsuccessfully received by the base station and feedback information of the PDCP PDU4 indicates that the PDCP PDU4 is unsuccessfully received by the base station.

It can be seen that the above embodiments are able to re-transmit the unsuccessfully transmitted PDCP PDUs by various implementations.

In the above embodiments, re-transmission of unsuccessfully transmitted data are implemented to ensure reliability of service supporting the PDCP packet replication function, by re-transmitting the unsuccessfully transmitted PDCP PDUs for the DRB or the SRB, allocated with the replication function of the PDCP packets, of the two RLC entities adopting the RLC UM mode.

Figure 9A:
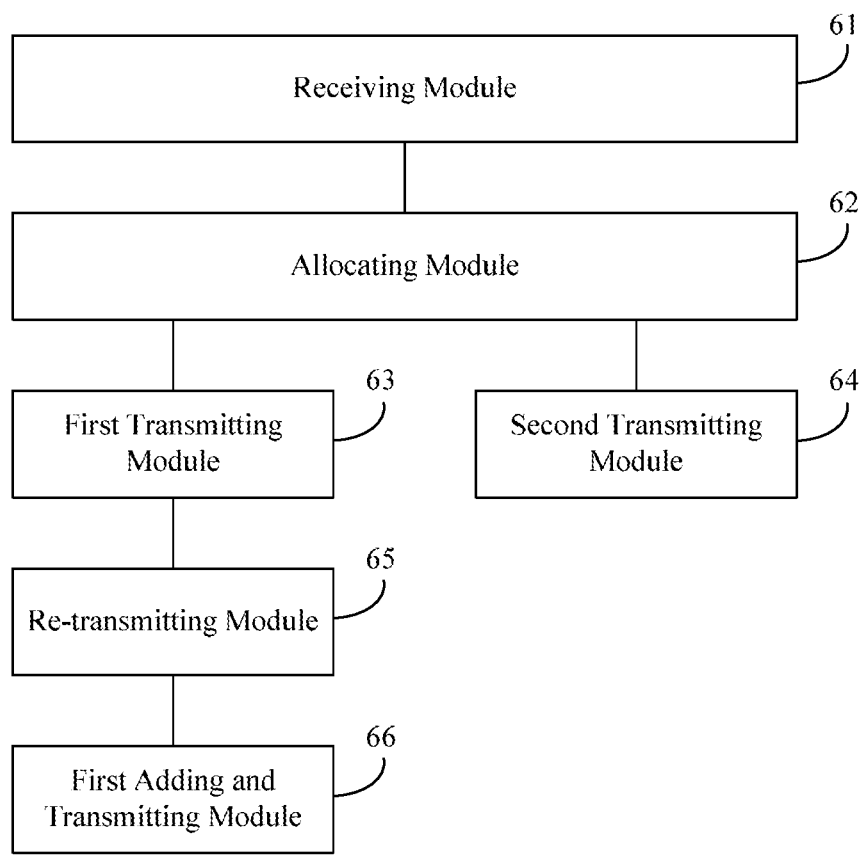
FIG. 9A is a block diagram of another function allocating device shown in an exemplary embodiment.

FIG. 9A is a block diagram of another function allocating device shown in an exemplary embodiment. As shown in FIG. 9A, the function allocating device further includes a first adding and transmitting module 66 on the basis of the embodiment shown in FIG. 8. The first adding and transmitting module 66 is configured to add a polling instruction in the current PDCP PDU as the current PDCP PDU being generated and predefined requirements being met, and transmit the current PDCP PDU to the base station, before the re-transmitting module 65 re-transmitting the current PDCP PDU, wherein the polling instruction instructs the base station to transmit feedback information of the current PDCP PDU and feedback information of PDCP PDUs transmitted before the current PDCP PDU.

The predefined requirements include, but are not limited to, any one of the followings. A sum of data bytes of the current PDCP PDU and the PDCP PDUs, transmitted before the current PDCP PDU, reaches a first predefined value. A number of the current PDCP PDU and the PDCP PDUs, transmitted before the current PDCP PDU, reaches a second predefined value. A transmitting window fails to transmit new PDCP PDUs after the current PDCP PDUs are transmitted. None of PDCP PDUs is transmitted after the current PDCP PDU is transmitted. The first predefined value and the second predefined value are determined by the RRC layer.

For example, the UE transmits a PDCP PDU1 and a PDCP PDU2 to the base station, and then generates a PDCP PDU3. When the PDCP PDU3 is generated, a polling instruction will be added in the PDCP PDU3 as a sum of data bytes of the PDCP PDU1, the PDCP PDU2 and the PDCP PDU3 reached the first predefined value. The PDCP PDU3 then is transmitted to the base station. The base station then transmits, in response to the polling instruction, feedback information of the PDCP PDU1, the PDCP PDU2 and the PDCP PDU3 to the UE, after the PDCP PDU3 is received. The PDCP PDU1 will be re-transmitted by the UE, when a feedback information, transmitted by the base station, of the PDCP PDU1 is not received within the first predefined time interval after the PDCP PDU1 is transmitted.

The first adding and transmitting module 66 is further configured to reset the sum of data bytes of the current PDCP PDU and the PDCP PDUs transmitted before the current PDCP PDU, as adding the polling instruction in the current PDCP PDU, when the predefined requirement of a sum of data bytes of the current PDCP PDU and the PDCP PDUs, transmitted before the current PDCP PDU, reached a first predefined value is met; or reset the number of the current PDCP PDU and the PDCP PDUs transmitted before the current PDCP PDU, as adding the polling instruction in the current PDCP PDU, when the predefined requirement of a number of the current PDCP PDU and the PDCP PDUs, transmitted before the current PDCP PDU, reached a second predefined value is met.

In the above embodiments, the base station is able to transmit, in response to the polling instruction, the feedback information of the current PDCP PDU and the PDCP PDUs transmitted before the current PDCP PDU to the UE, and the unsuccessfully transmitted PDCP PDUs then will be determined, by adding the polling instruction in the current PDCP PDU as the current PDCP PDU being generated and predefined requirements being met, and transmitting the current PDCP PDU to the base station.

Figure 9B:
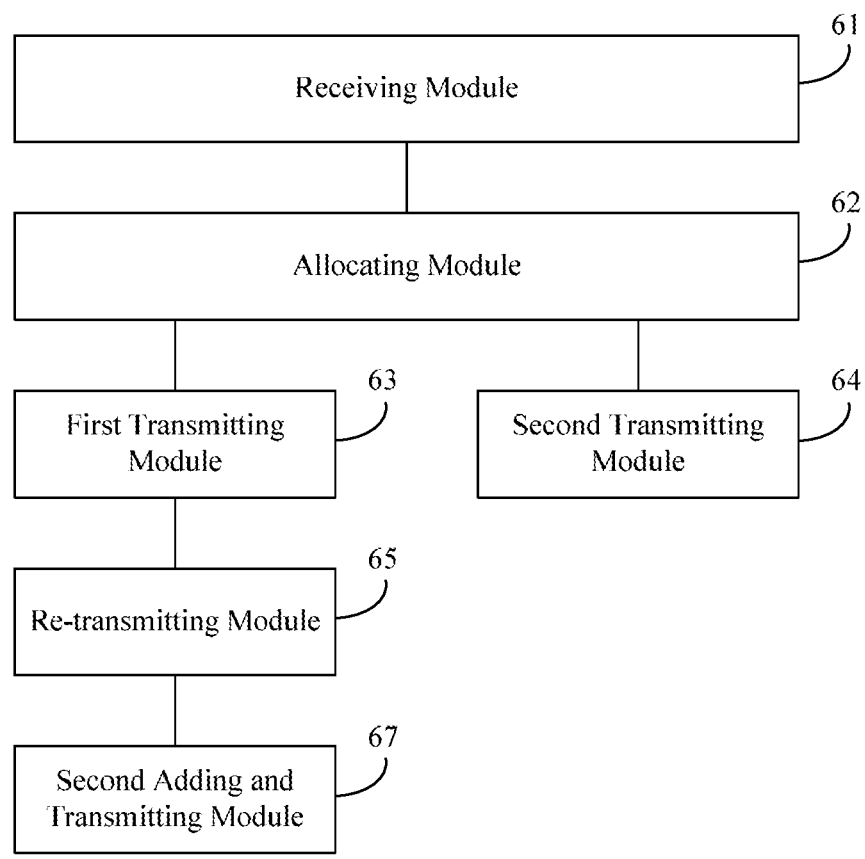
FIG. 9B is a block diagram of another function allocating device shown in an exemplary embodiment.

FIG. 9B is a block diagram of another function allocating device shown in an exemplary embodiment. As shown in FIG. 9B, the function allocating device further includes a second adding and transmitting module 67 on the basis of the embodiment shown in FIG. 8.

The second adding and transmitting module 67 is configured to add a polling instruction in the current PDCP PDU as the current PDCP PDU being generated, and transmitting the current PDCP PDU to the base station, without receiving feedback information of other PDCP PDUs and a time interval, after transmitting other PDCP PDUs, except the current PDCP PDU, being greater than a second predefined time interval, before the re-transmitting module 65 re-transmitting the current PDCP PDU, wherein the polling instruction is used to instructs the base station to transmit feedback information of the current PDCP PDU and feedback information of PDCP PDUs transmitted before the current PDCP PDU. The second predefined time interval is determined by the RRC layer.

For example, a polling instruction will be added in the PDCP PDU2 as the PDCP PDU2 being generated by the UE, when feedback information of a PDCP PDU1 being not received within the second predefined time interval after the PDCP PDU1 is transmitted to the base station. The PDCP PDU2 is then transmitted to the base station. The base station then transmits, in response to the polling instruction, feedback information of the PDCP PDU1 and the PDCP PDU2, to the UE, after the PDCP PDU2 is received. The PDCP PDU2 will be re-transmitted by the UE, when a feedback information of the PDCP PDU2, indicating the PDCP PDU2 unsuccessfully received by the base station, being received within the first predefined time interval after the PDCP PDU2 is transmitted.

In the above embodiments, the base station is able to transmit, in response to the polling instruction, the feedback information of the current PDCP PDU and the PDCP PDUs transmitted before the current PDCP PDU to the UE, and the unsuccessfully transmitted PDCP PDUs then will be determined, by adding the polling instruction in the current PDCP PDU as the current PDCP PDU being generated, and transmitting the current PDCP PDU to the base station, without receiving the feedback information of the PDCP PDUs and the time interval, after the transmission of other PDCP PDUs, except the current PDCP PDU, being completed, being greater than the second predefined time interval.

Figure 10:
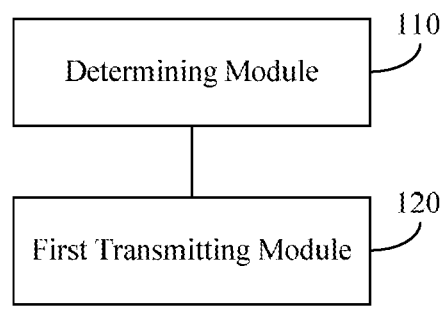
FIG. 10 is a block diagram of a message transmitting device shown in an exemplary embodiment.

FIG. 10 is a block diagram of a message transmitting device shown in an exemplary embodiment, the message transmitting device is configured in the base station. As shown in FIG. 10, the message transmitting device includes a determining module 110 and a first transmitting module 120.

The determining module 110 is configured to determine a pending allocated DRB or SRB of a replication function or a distribution function of PDCP packets.

In this embodiment, the base station is able to determine one or some DRBs or SRBs pending for being allocated with one of the replication function or the distribution function of the PDCP packets.

The first transmitting module 120 is configured to transmit an RRC message carrying allocation information to a UE, wherein the allocation information is used to allocate two RLC entities, and one of the replication function or the distribution function of PDCP packets for the DRB or the SRB determined by the determining module 110.

In this embodiment, the base station is able to transmit the RRC message carrying allocation information to the UE, after the pending allocated DRB or SRB of the replication function or the distribution function of PDCP packets is determined. The allocation information is used to allocate RLC entities, and one of the replication function or the distribution function of PDCP packets for the DRB or the SRB.

The two RLC entities allocated with the DRB or the SRB adopt the same RLC mode. In this embodiment, the RLC mode of the two RLC entities of the DRB allocated with the replication function of the PDCP packets includes the RLC UM mode, and the RLC mode of the two RLC entities of the SRB allocated with the replication function of the PDCP packets includes the RLC UM mode or the RLC AM mode.

In the above embodiments, the UE is allowed to allocate, in response to the received RRC message, the two RLC entities, and one of the replication function or the distribution function of PDCP packets for the DRB or the SRB, and the DRB or SRB is allocated with one of the replication function or the distribution function of the PDCP packets, by transmitting the RRC message to the UE.

FIG. 11 is a block diagram of another message transmitting device shown in an exemplary embodiment. As shown in FIG. 11, the message transmitting device further includes a first receiving and transmitting module 130 on the basis of the embodiment shown in FIG. 10. The first receiving and transmitting module 130 is configured to receive PDCP PDUs transmitted by the UE and transmit, at predefined time intervals, feedback information of the PDCP PDUs to the UE, after the RRC message is transmitted, by the first transmitting module 120, to the UE.

In this embodiment, the base station is able to transmit, at the predefined time intervals, feedback information of PDCP PDUs to the UE, after receiving the PDCP PDUs transmitted by the UE.

In the above embodiments, the UE is allowed to determine and re-transmit unsuccessfully transmitted PDCP PDUs after receiving the feedback information of the PDCP PDUs, by receiving PDCP PDUs transmitted by the UE and transmitting, at predefined time intervals, feedback information of the PDCP PDUs to the UE.

Figure 11A:
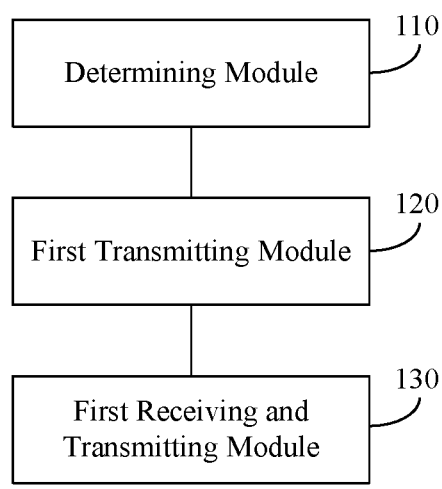
FIG. 11A is a block diagram of another message transmitting device shown in an exemplary embodiment.
Figure 11B:
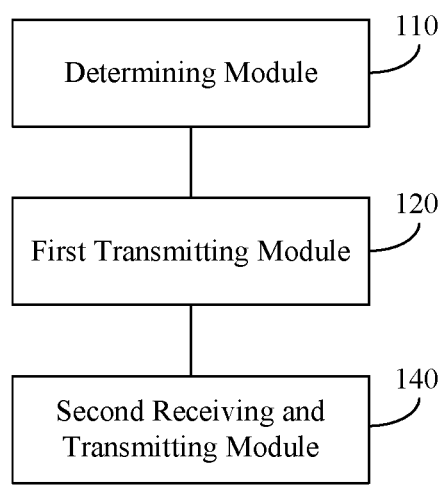
FIG. 11B is a block diagram of another message transmitting device shown in an exemplary embodiment.

FIG. 11B is a block diagram of another message transmitting device shown in an exemplary embodiment. As shown in FIG. 11B, the message transmitting device further includes a second receiving and transmitting module 140 on the basis of the embodiment shown in FIG. 10. The second receiving and transmitting module 140 is configured to receive PDCP PDUs transmitted by the UE and transmit feedback information of the PDCP PDUs to the UE, after the RRC message is transmitted, by the first transmitting module 120, to the UE.

In the above embodiments, the UE is allowed to determine and re-transmit unsuccessfully transmitted PDCP PDUs after receiving the feedback information of the PDCP PDUs, by receiving PDCP PDUs transmitted by the UE and transmitting feedback information of the PDCP PDUs to the UE.

Figure 11C:
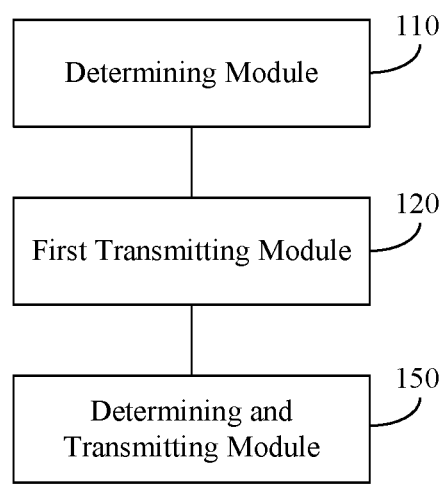
FIG. 11C is a block diagram of another message transmitting device shown in an exemplary embodiment.

FIG. 11C is a block diagram of another message transmitting device shown in an exemplary embodiment. As shown in FIG. 11C, the message transmitting device further includes a determining and transmitting module 150 on the basis of the embodiment shown in FIG. 10. The determining and transmitting module 150 is configured to transmit feedback information, of a PDCP PDU for triggering a re-queuing timer and PDCP PDUs being queued in a receiving window before the PDCP PDU to the UE, as the triggered re-queuing timer being timeout, after the RRC message is transmitted, by the first transmitting module 120, to the UE.

In the above embodiments, the UE is allowed to determine and re-transmit unsuccessfully transmitted PDCP PDUs after receiving the feedback information of the PDCP PDU, by transmitting feedback information of the PDCP PDU for triggering the re-queuing timer and PDCP PDUs being queued in the receiving window before the PDCP PDU to the UE, as the triggered re-queuing timer being timeout.

Figure 11D:
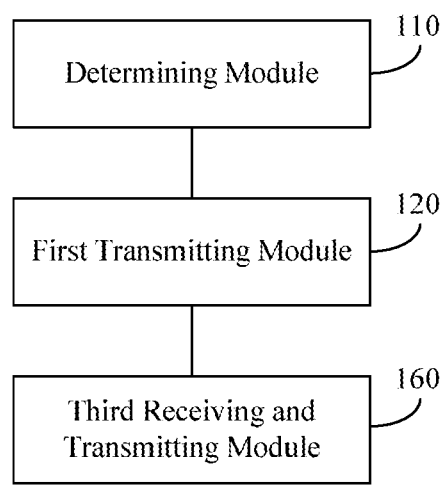
FIG. 11D is a block diagram of another message transmitting device shown in an exemplary embodiment.

FIG. 11D is a block diagram of another message transmitting device shown in an exemplary embodiment. As shown in FIG. 11D, the message transmitting device further includes a third receiving and transmitting module 160 on the basis of the embodiment shown in FIG. 10. The third receiving and transmitting module 160 is configured to transmit, in response to a polling instruction, feedback information of a PDCP PDU carrying the polling instruction and PDCP PDUs received before the PDCP PDU to the UE, as the PDCP PDU carrying the polling instruction being received, after the RRC message is transmitted, by the first transmitting module 120, to the UE.

In the above embodiments, the UE is allowed to determine and re-transmit unsuccessfully transmitted PDCP PDUs, in response to received feedback information of the PDCP PDUs, by transmitting, in response to the polling instruction, feedback information of the PDCP PDU carrying the polling instruction and PDCP PDUs received before the PDCP PDU to the UE, after the PDCP PDU carrying the polling instruction is received.

Figure 12:
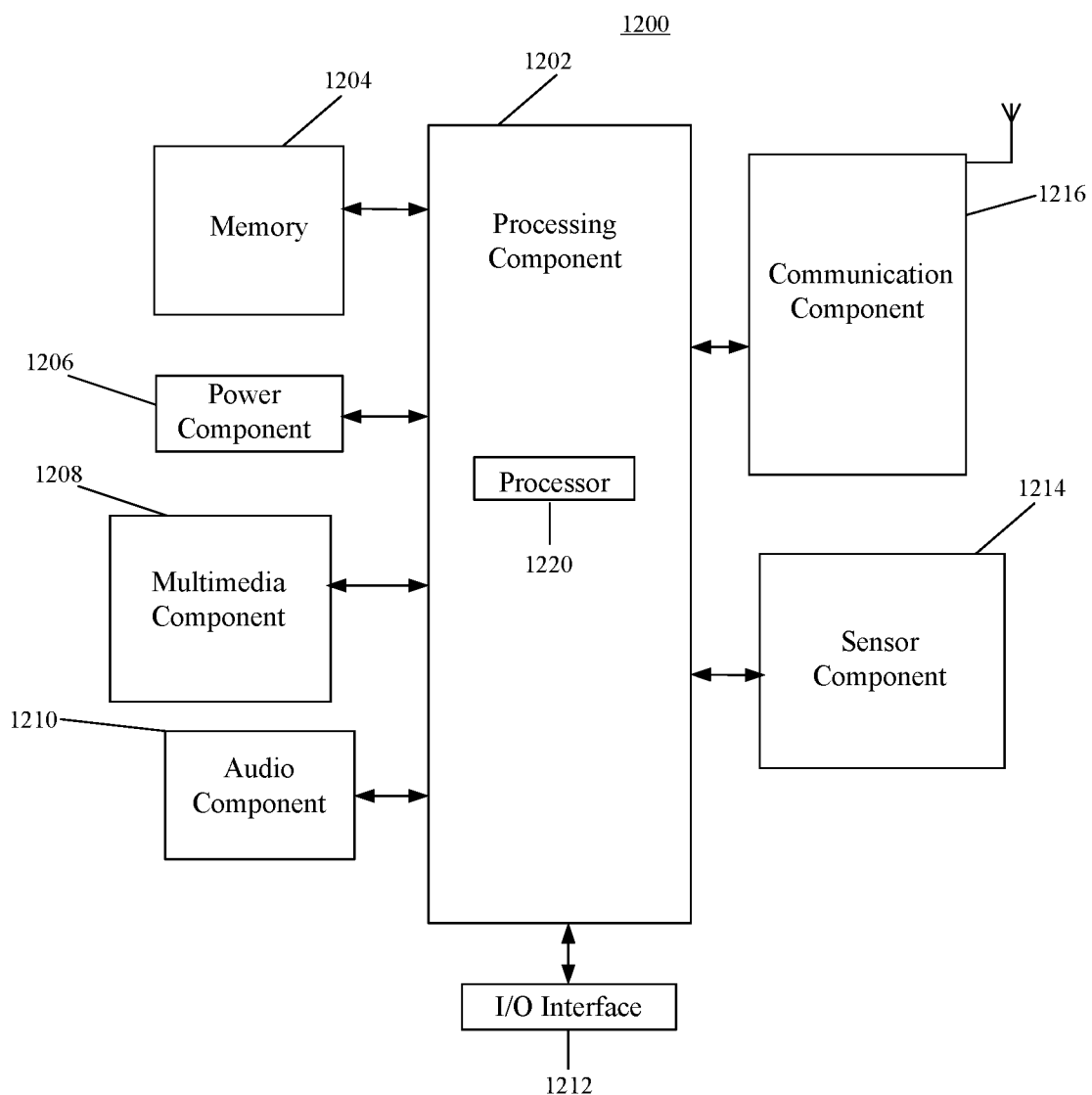
FIG. 12 is a block diagram of a device, applied to a function allocating device, shown in an exemplary embodiment.

FIG. 12 is a block diagram of a device, applied to a function allocating device, shown in an exemplary embodiment. For example, the device 1200 may be a mobile phone, a computer, a digital broadcast terminal, a messaging device, a gaming console, a tablet, a medical device, an exercise equipment, a personal digital assistant, and the like.

Referring to FIG. 12, the device 1200 may include one or more of a processing component 1202, a memory 1204, a power component 1206, a multimedia component 1208, an audio component 1210, an input/output (I/O) interface 1212, a sensor component 1214, and a communication component 1216.

The processing component 1202 typically controls whole operations of the device 1200, such as the operations associated with displaying, telephone calls, data communications, camera operations, and recording operations. The processing component 1202 may include one or more processors 1220 to execute instructions for performing all or portions of the steps in the described methods. Moreover, the processing component 1202 may include one or more modules which facilitate the interactions between the processing component 1202 and other components. For instance, the processing component 1202 may include a multimedia module to facilitate the interactions between the multimedia component 1208 and the processing component 1202.

The memory 1204 is configured to store various types of data for supporting the operations of the device 1200. Examples of the data include instructions for applications or methods operated on the device 1200, contact data, phone-book data, messages, pictures, and video stream, etc. The memory 1204 includes any type of volatile or non-volatile memory devices, or a combination thereof, e.g. a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk and optical disk.

The power component 1206 provides power to different components of the device 1200. The power component 1206 may include a power management system, one or more power sources, and other components related to power generating, power management, and power distribution in the device 1200.

The multimedia component 1208 includes a display screen for providing an output interface which provides interactions between the device 1200 and the user. In some embodiments, the display screen may include a liquid crystal display (LCD) and a touch panel (TP). In some embodiments, an organic light-emitting diode (OLED) display or other types of displays can be adopted.

If the display screen includes the touch panel, the display screen works as a touch screen for receiving input signals caused by the operations made by the user. The touch panel includes one or more touch sensors to sense touches, swipes, and gestures applied on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and the rear camera may receive external multimedia data while the device 1200 is in an operation mode, e.g. a photographing mode or a video mode. Each of the front camera and the rear camera may be a fixed optical lens system or have focusing and optical zoom capability.

The audio component 1210 is configured to output and/or input audio signals. For example, the audio component 1210 includes a microphone ("MIC"). The audio component 1210 is configured to receive an external audio signal when the device 1200 is in an operation mode, e.g. a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 is an interface between the processing component 1202 and peripheral interface modules, e.g. a keyboard, a click wheel, buttons, etc. The buttons include, a home button, a volume button, a starting button, and a locking button, but are not limited thereto.

The sensor component 1214 includes one or more sensors to provide status assessments of various aspects of the device 1200. For example, the sensor component 1214 detects turn-on/turn-off of the device 1200, positioning of components, e.g., the display and the keypad, of the device 1200. The sensor component 1214 further detects a position change of the device 1200 or a component of the device 1200, the contact status between the user and the device 1200, a position or moving speed (acceleration/deceleration) of the device 1200, and temperature variation of the device 1200. The sensor component 1214 may include a proximity sensor which is configured to detect the presence of nearby objects without any physical contact. The sensor component 1214 may also include a light sensor, such as a CMOS or CCD image sensor, for imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, in wired or wireless, between the device 1200 and other devices. The device 1200 can access a wireless network with a communication standard, such as Wi-Fi, 2G, or 3G, or a combination thereof. In one exemplary embodiment, the communication component 1216 receives a broadcast signal or broadcast related information from an external broadcast management system via a broadcast channel. In one exemplary embodiment, the communication component 1216 further includes a near field communication (NFC) module to facilitate short-range communications. For example, the NFC module utilizes a radio frequency identification (RFID) technology, an infrared data association (IrDA) technology, an ultra-wideband (UWB) technology, a Bluetooth (BT) technology, and other technologies.

In exemplary embodiments, the device 1200 includes one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

Figure 13:
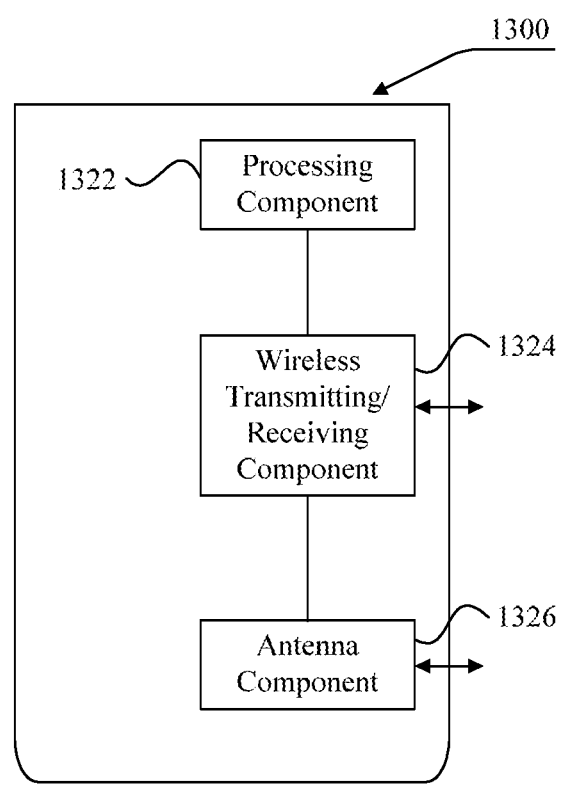
FIG. 13 is a block diagram of a device, applied to a message transmitting device, shown in an exemplary embodiment.

FIG. 13 is a block diagram of another device, applied to a message transmitting device, shown in an exemplary embodiment. The device 1300 may be provided as a base station. Referring to FIG. 13, the device 1300 includes a processing component 1322, a wireless transmitting/receiving component 1324, an antenna component 1326 and a signal processing component of a wireless interface. The processing component 1322 may further include one or more processors.

One of the processors of the processing component 1322 may be configured to determine a pending allocated DRB or a pending allocated SRB of a replication function or a distribution function of PDCP packets; and transmit an RRC message carrying allocation information to a UE, the allocation information is used to allocate two RLC entities, and one of the replication function or the distribution function of PDCP packets for the DRB or the SRB.

Various embodiments of the present disclosure can have one or more of the following advantages.

One DRB or SRB is allocated with one of the replication function or the distribution function of the PDCP packets, by allocating, in response to the RRC message, the two RLC entities, and one of the replication function or the distribution function of the PDCP packets for the DRB or the SRB.

Complexity of processing the PDU by the PDCP layer, as well as time delay of receiving the PDCP PDU by the base station are reduced, by the two RLC entities allocated for the DRB or the SRB adopting the same RLC mode.

Waste of wireless resources is reduced, by allocating the RLC mode, of the two RLC entities of the DRB allocated with the replication function of the PDCP packets, as the RLC UM mode, and allocating the RLC mode, of the two RLC entities of the SRB allocated with the replication function of the PDCP packets, as the RLC UM mode or the RLC AM mode.

Re-transmission of unsuccessfully transmitted data are implemented to ensure reliability of service supporting the PDCP packet replication function, by re-transmitting the unsuccessfully transmitted PDCP PDUs for the DRB or the SRB, allocated with the replication function of the PDCP packets, of the two RLC entities adopting the RLC UM mode.

Success rate of transmission is increased, by transmitting PDCP PDUs of the DRB or the SRB, allocated with the replication function of the PDCP packets, through the two corresponding RLC entities. Moreover, speed of transmission and number of successfully transmitted PDUs at per unit interval are increased, by dividing the PDCP PDUs of the DRB or the SRB, allocated with the distribution function, into two groups, and transmitting one group through one RLC entity, and transmitting the other group through the other RLC entity.

Re-transmission of unsuccessfully transmitted data are implemented to ensure reliability of service supporting the PDCP packet replication function, by re-transmitting the unsuccessfully transmitted PDCP PDUs for the DRB or the SRB, allocated with the replication function of the PDCP packets, of the two RLC entities adopting the RLC UM mode.

A method for re-transmitting the PDCP PDU is implemented, by re-transmitting the current PDCP PDU, when the feedback information transmitted by the base station of the current PDCP PDU being not received or the feedback information transmitted by the base station indicating the current PDCP PDU unsuccessfully received.

Another method for re-transmitting the PDCP PDU is implemented, by re-transmitting the PDCP PDUs unsuccessfully received by the base station, when the received feedback information indicates that the PDCP PDUs are unsuccessfully received by the base station.

The base station is able to transmit, in response to the polling instruction, the feedback information of the current PDCP PDU and the PDCP PDUs transmitted before the current PDCP PDU to the UE, and the unsuccessfully transmitted PDCP PDUs then will be determined, by adding the polling instruction in the current PDCP PDU as the current PDCP PDU being generated and predefined requirements being met, and transmitting the current PDCP PDU to the base station.

The base station is able to transmit, in response to the polling instruction, the feedback information of the current PDCP PDU and the PDCP PDUs transmitted before the current PDCP PDU to the UE, and the unsuccessfully transmitted PDCP PDUs then will be determined, by adding the polling instruction in the current PDCP PDU as the current PDCP PDU being generated, and transmitting the current PDCP PDU to the base station, without receiving the feedback information of the PDCP PDUs and the time interval, after the transmission of other PDCP PDUs, except the current PDCP PDU, being completed, being greater than the second predefined time interval.

Basis of whether to add polling instructions in new PDCP PDUs are provided, by resetting, the sum of data bytes of the current PDCP PDU and the PDCP PDUs transmitted before the current PDCP PDU, or the number of the current PDCP PDU and the PDCP PDUs transmitted before the current PDCP PDU.

The UE is allowed to allocate, in response to the received RRC message, the two RLC entities, and one of the replication function or the distribution function of PDCP packets for the DRB or the SRB, and the DRB or SRB is allocated with one of the replication function or the distribution function of the PDCP packets, by transmitting the RRC message to the UE.

Complexity of processing the PDU by the PDCP layer, as well as time delay of receiving the PDCP PDU by the base station are reduced, by the two RLC entities allocated for the DRB or the SRB adopting the same RLC mode.

Waste of wireless resources is reduced, by allocating the RLC mode, of the two RLC entities of the DRB allocated with the replication function of the PDCP packets, as the RLC UM mode, and allocating the RLC mode, of the two RLC entities of the SRB allocated with the replication function of the PDCP packets, as the RLC UM mode or the RLC AM mode.

The UE is allowed to determine and re-transmit unsuccessfully transmitted PDCP PDUs after receiving the feedback information of the PDCP PDU, by receiving PDCP PDUs transmitted by the UE and transmitting, at predefined time intervals, feedback information of the PDCP PDUs to the UE.

The UE is allowed to determine and re-transmit unsuccessfully transmitted PDCP PDUs after receiving the feedback information of the PDCP PDU, by receiving PDCP PDUs transmitted by the UE and transmitting feedback information of the PDCP PDUs to the UE.

The UE is allowed to determine and re-transmit unsuccessfully transmitted PDCP PDUs after receiving the feedback information of the PDCP PDU, by transmitting feedback information of the PDCP PDU for triggering the re-queuing timer and PDCP PDUs being queued, in the receiving window, before the PDCP PDU to the UE, as the triggered re-queuing timer being timeout.

The UE is allowed to determine and re-transmit unsuccessfully transmitted PDCP PDUs, in response to received feedback information of the PDCP PDUs, by transmitting, in response to the polling instruction, feedback information of the PDCP PDU carrying the polling instruction and PDCP PDUs received before the PDCP PDU to the UE, after the PDCP PDU carrying the polling instruction is received.

The device embodiments can correspond to the method embodiments, therefore, relevant information of the device embodiments refers to the description of the method embodiments. The described device embodiments are illustrative, wherein the units described as separate components may or may not be physically separate, and the components displayed as units may or may not be physical units, i.e., may be located at a place, or be distributed to multiple network units. Some or all of the modules may be selected as needed to achieve the purpose of the solution of the embodiment.

It should be noted that, in this context, relational terms such as first and second are used to distinguish one entity or operation from another entity or operation, but not to require or imply any relations or orders between these entities or operations. The terms "including", "include" and their variants are intended to include non-exclusive inclusion, so that a process, a method, an object or a device including a plurality of elements includes not only those elements but also other elements not specifically listed, or elements that are inherent to the process, the method, the object or the device. Elements defined by the phrase "including a . . . " do not exclude the presence of additional equivalent elements in the process, the method, the object or the device, without more restrictions.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer. Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A function allocating method comprising:
receiving a radio resource control (RRC) message carrying allocation information transmitted by a base station, wherein the allocation information is used to allocate two radio link control (RLC) entities and only one selected from a replication function and a distribution function of packet data convergence protocol (PDCP) packets to a data radio bearer (DRB) or a signaling radio bearer (SRB);
allocating, in response to the RRC message, the two RLC entities, and the only one selected from the replication function and the distribution function of the PDCP packets to the DRB or the SRB;
re-transmitting unsuccessfully transmitted PDCP PDUs for the DRB or the SRB, allocated with the replication function of the PDCP packets, of the two RLC entities adopting a RLC UM mode, after transmitting PDCP packet data units (PDUs) of the DRB or the SRB, allocated with the replication function of the PDCP packets, through the two corresponding RLC entities; and
wherein the re-transmitting unsuccessfully transmitted PDCP PDUs comprises:
re-transmitting a current PDCP PDU when feedback information, transmitted by the base station, of the current PDCP PDU is not received within a first predefined time interval after the current PDCP PDU is transmitted, or feedback information, transmitted by the base station, indicating the current PDCP PDU being unsuccessfully received, which is received within the first predefined time interval after the current PDCP PDU is transmitted; and
wherein adding a polling instruction in the current PDCP PDU as the current PDCP PDU is generated and predefined requirements are met, and transmitting the current PDCP PDU to the base station, before re-transmitting the current PDCP PDU, wherein the polling instruction instructs the base station to transmit feedback information of the current PDCP PDU and feedback information of PDCP PDUs transmitted before the current PDCP PDU;
wherein the predefined requirements comprise:
a sum of data bytes of the current PDCP PDU and data bytes of the PDCP PDUs transmitted before the current PDCP PDU, reached a first predefined value; or
a number of the current PDCP PDU and the PDCP PDUs transmitted before the current PDCP PDU, reached a second predefined value; or
a transmitting window which fails to transmit new PDCP PDUs after the current PDCP PDUs are transmitted; or
none of PDCP PDUs being transmitted after the current PDCP PDU is transmitted.

2. The method of claim 1, wherein the two RLC entities adopt the same RLC mode.

3. The method of claim 2, wherein the RLC mode of the two RLC entities of the DRB allocated with the replication function of the PDCP packets comprises an RLC unacknowledged mode (UM), and the RLC mode of the two RLC entities of the SRB allocated with the replication function of the PDCP packets comprises an RLC UM or an RLC acknowledged mode (AM).

4. The method of claim 3, further comprising:
transmitting the PDCP packet data units (PDUs) of the DRB or the SRB, allocated with the replication function of the PDCP packets, through the two RLC entities; or
dividing the PDCP PDUs of the DRB or the SRB, allocated with the distribution function, into two groups, and transmitting one group through one RLC entity, and transmitting the other group through the other RLC entity.

5. The method of claim 1, wherein the re-transmitting unsuccessfully transmitted PDCP PDUs further comprises:
re-transmitting PDCP PDUs unsuccessfully received by the base station, when received feedback information indicates that the PDCP PDUs are unsuccessfully received by the base station.

6. The method of claim 1, further comprising:
adding a polling instruction in the current PDCP PDU, as the current PDCP PDU is generated, without receiving feedback information of other PDCP PDUs and a time interval, after a transmission of other PDCP PDUs except for the current PDCP PDU, is completed, being greater than a second predefined time interval, before the step of re-transmitting a current PDCP PDU, wherein the polling instruction is used to instructs the base station to transmit feedback information of the current PDCP PDU and feedback information of PDCP PDUs transmitted before the current PDCP PDU.

7. The method of claim 1, further comprising:
resetting the sum of data bytes of the current PDCP PDU and data bytes of the PDCP PDUs, transmitted before the current PDCP PDU as adding the polling instruction in the current PDCP PDU, when the predefined requirement of the sum of data bytes of the current PDCP PDU and data bytes of the PDCP PDUs, transmitted before the current PDCP PDU, reached the first predefined value is met; or resetting the number of the current PDCP PDU and the PDCP PDUs, transmitted before the current PDCP PDU as adding the polling instruction in the current PDCP PDU, when the predefined requirement of the number of the current PDCP PDU and the PDCP PDUs, transmitted before the current PDCP PDU, reached the second predefined value is met.

8. A communication system implementing the method of claim 1, comprising the base station and user equipment (UE), wherein the base station is configured to transmit, in response to a polling instruction, feedback information of current PDCP packet data unit (PDU) and PDCP PDUs transmitted before the current PDCP PDU to the UE, and the UE is configured to determine unsuccessfully transmitted PDCP PDUs based on the feedback information.

9. The communication system according to claim 8, wherein the UE is configured to reduce complexity of processing PDUs by a PDCP layer and time delay of receiving the PDCP PDUs by the base station through the two RLC entities allocated for the DRB or the SRB adopting a same RLC mode.

10. A message transmitting method comprising:

determining a data radio bearer (DRB) or a signaling radio bearer (SRB) to be allocated with only one selected from a replication function and a distribution function of packet data convergence protocol (PDCP) packets; and transmitting a radio resource control (RRC) message carrying allocation information to user equipment (UE), wherein the allocation information is used to allocate two radio link control (RLC) entities, and the only one selected from the replication function and the distribution function of PDCP packets for the DRB or the SRB;

wherein the two RLC entities adopt the same RLC mode; and the RLC mode of the two RLC entities of the DRB allocated with the replication function of the PDCP packets comprises an RLC unacknowledged mode (UM), and the RLC mode of the two RLC entities of the SRB allocated with the replication function of the PDCP packets comprises an RLC UM or an RLC acknowledged mode (AM);

the method further comprising:

transmitting feedback information of a PDCP PDU for triggering a re-queuing timer and PDCP PDUs being queued, in a receiving window, before the PDCP PDU to the UE, as the triggered re-queuing timer is timeout, after the step of transmitting a radio resource control (RRC) message carrying allocation information to user equipment (UE).

11. The method of claim 10, further comprising:

receiving PDCP packet data units (PDUs) transmitted by the UE and transmitting, at predefined time intervals, feedback information of the PDCP PDUs to the UE, after the step of transmitting a radio resource control (RRC) message carrying allocation information to user equipment (UE).

12. The method of claim 10, further comprising:

receiving PDCP PDUs transmitted by the UE and transmitting feedback information of the PDCP PDUs to the UE, after the step of transmitting a radio resource control (RRC) message carrying allocation information to user equipment (UE).

13. The method of claim 10, further comprising:

transmitting, in response to a polling instruction, feedback information of a PDCP PDU carrying the polling instruction and PDCP PDUs received before the PDCP PDU to the UE, as the PDCP PDU carrying the polling instruction is received, after the step of transmitting a radio resource control (RRC) message carrying allocation information to user equipment (UE).

14. User equipment, comprising:

a processor; and memory for storing instructions executable by the processor;

wherein the processor is configured to:

receive a radio resource control (RRC) message carrying allocation information transmitted by a base station, wherein the allocation information is used to allocate two radio link control (RLC) entities and only one selected from a replication function and a distribution function of packet data convergence protocol (PDCP) packets to a data radio bearer (DRB) or a signaling radio bearer (SRB);

allocate, in response to the RRC message, the two RLC entities, and the only one selected from the replication function and the distribution function of the PDCP packets for the DRB or the SRB; and re-transmit unsuccessfully transmitted PDCP PDUs for the DRB or the SRB, allocated with the replication function of the PDCP packets, of the two RLC entities adopting a RLC UM mode, after transmitting PDCP packet data units (PDUs) of the DRB or the SRB, allocated with the replication function of the PDCP packets, through the two corresponding RLC entities;

wherein the re-transmitting unsuccessfully transmitted PDCP PDUs comprises:

re-transmitting a current PDCP PDU when feedback information, transmitted by the base station, of the current PDCP PDU is not received within a first predefined time interval after the current PDCP PDU is transmitted, or feedback information, transmitted by the base station, indicating the current PDCP PDU being unsuccessfully received, which is received within the first predefined time interval after the current PDCP PDU is transmitted; and wherein adding a polling instruction in the current PDCP PDU as the current PDCP PDU is generated and predefined requirements are met, and transmitting the current PDCP PDU to the base station, before re-transmitting the current PDCP PDU, wherein the polling instruction instructs the base station to transmit feedback information of the current PDCP PDU and feedback information of PDCP PDUs transmitted before the current PDCP PDU;

wherein the predefined requirements comprise:

a sum of data bytes of the current PDCP PDU and data bytes of the PDCP PDUs transmitted before the current PDCP PDU, reached a first predefined value; or a number of the current PDCP PDU and the PDCP PDUs transmitted before the current PDCP PDU, reached a second predefined value; or a transmitting window which fails to transmit new PDCP PDUs after the current PDCP PDUs are transmitted; or none of PDCP PDUs being transmitted after the current PDCP PDU is transmitted.

* * * * *